(12) United States Patent
Jankovic

(10) Patent No.: US 7,503,167 B2
(45) Date of Patent: Mar. 17, 2009

(54) INTERNAL COMBUSTION ENGINE WITH MULTIPLE COMBUSTION MODES AND FUEL VAPOR PURGING

(75) Inventor: Mrdjan Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 517 days.

(21) Appl. No.: 11/282,133

(22) Filed: Nov. 18, 2005

(65) Prior Publication Data

US 2007/0113541 A1    May 24, 2007

(51) Int. Cl.
*F01N 3/00* (2006.01)
(52) U.S. Cl. .............................. 60/285; 60/283; 60/286; 123/295; 123/300; 123/305; 123/516
(58) Field of Classification Search .................... 60/283, 60/285, 284, 286; 123/295, 299, 300, 304, 123/305, 516, 518, 519
See application file for complete search history.

(56) References Cited

U.S. PATENT DOCUMENTS

| | | | |
|---|---|---|---|
| 5,036,668 | A | 8/1991 | Hardy |
| 6,267,097 | B1 | 7/2001 | Urushihara et al. |
| 6,276,334 | B1 | 8/2001 | Flynn et al. |
| 6,293,246 | B1 | 9/2001 | Tanahashi et al. |
| 6,295,973 | B1 | 10/2001 | Yang |
| 6,336,436 | B1 | 1/2002 | Miyakubo et al. |
| 6,390,054 | B1 | 5/2002 | Yang |
| 6,516,774 | B2 | 2/2003 | zur Loye et al. |
| 6,570,265 | B1 | 5/2003 | Shiraishi et al. |
| 6,619,254 | B2 | 9/2003 | Chmela et al. |
| 6,622,710 | B2 | 9/2003 | Hasegawa et al. |
| 6,675,579 | B1 | 1/2004 | Yang |
| 6,725,825 | B1 | 4/2004 | Kurtz et al. |
| 6,739,295 | B1 | 5/2004 | Yamaoka et al. |
| 6,923,167 | B2 | 8/2005 | Flowers |
| 6,932,175 | B2 | 8/2005 | Teraji et al. |

(Continued)

OTHER PUBLICATIONS

Lang et al., "Thermodynamical and Mechanical Approach Towards a Variable Valve Train for the Controlled Auto Ignition Combustion Process," SAE Technical Paper Series, Apr. 11-14, 2005, 2005-01-0762, SAE International, Warrendale, Pennsylvania.

*Primary Examiner*—Binh Q. Tran
(74) *Attorney, Agent, or Firm*—Allan J. Lippa; Alleman Hall McCoy Russell & Tuttle LLP

(57) ABSTRACT

An internal combustion engine having a plurality of combustion cylinders and a fuel delivery system. The plurality of combustion cylinders are configured to receive a mixture of gasoline and air and combust such mixture, where some of the combustion cylinders are configured to operate in a spark ignition mode, with the remaining cylinders being configured to operate in a compression ignition mode. The engine may be configured to operate so that fuel vapor purge is added only to cylinders operating in the spark ignition mode. Alternatively, the engine may be operated in either a first purge mode, in which fuel vapor purge is added only to spark ignition cylinders, or a second purge mode, in which fuel vapor purge is added to spark ignition cylinders and compression ignition cylinders. Additionally, even where purge is added to spark ignition cylinders and compression ignition cylinders, air-fuel control may be based on exhaust sensor data from spark ignition cylinders, without reference to any such data from compression ignition cylinders.

29 Claims, 15 Drawing Sheets

U.S. PATENT DOCUMENTS

| | | |
|---|---|---|
| 7,168,420 B1 * | 1/2007 | Yang ..................... 123/568.15 |
| 2004/0065279 A1 | 4/2004 | Hitomi et al. |
| 2004/0182359 A1 | 9/2004 | Stewart et al. |
| 2005/0121008 A1 | 6/2005 | Kilkenny et al. |
| 2005/0173169 A1 | 8/2005 | Gray, Jr. |
| 2007/0051350 A1 * | 3/2007 | Pallet et al. .................. 123/688 |
| 2007/0113541 A1 * | 5/2007 | Jankovic ...................... 60/285 |
| 2007/0205028 A1 * | 9/2007 | Leone et al. ............... 180/65.2 |
| 2007/0205029 A1 * | 9/2007 | Leone et al. ............... 180/65.2 |

* cited by examiner

INTERNAL COMBUSTION ENGINE WITH MULTIPLE COMBUSTION MODES AND FUEL VAPOR PURGING

BACKGROUND

Various types of combustion may be used in an internal combustion engine. For example, spark ignition (SI) of a homogenous mixture during the expansion stroke is one example method. This method relies on a timed spark from a sparking plug in order to achieve ignition within the combustion chamber of an air and fuel mixture. Another type of combustion may be referred to as homogeneous charge compression ignition (HCCI), which occurs when the temperature of the combustion chamber exceeds an autoignition temperature for the specific fuel resulting in autoignition. HCCI can be used to provide greater fuel efficiency and reduced NOx production under some conditions.

In some cases it may be desirable to enable the combustion cylinders of the engine to operate either in SI mode or in HCCI mode, and from time to time during operation, switch from one mode to the other, so as to obtain the benefits associated with the different combustion modes. The benefits obtained by mode switching may be somewhat offset, however, by temporary performance and/or efficiency losses occurring as a result of transitioning the combustion mode for all of the cylinders. The presence of SI and HCCI combustion modes also presents aftertreatment issues, due to the significant differences in HCCI and SI combustion.

The inventors herein have recognized that the presence of multiple combustion modes, the use of high manifold pressures in certain combustion modes, and/or the deployment of operating modes that are sensitive to air-fuel ratio changes can present challenges related to fuel vapor purging. For example, the uncertainties of vapor concentration and content in the fuel vapor purge entering the engine can affect autoignition timing, among other parameters.

Accordingly, in one aspect the present description provides for an internal combustion engine having a gasoline fuel injection system and a plurality of combustion cylinders. Each of the combustion cylinders is configured to receive gasoline from the gasoline fuel injection system and combust a mixture of air and gasoline in either a spark ignition mode or a sparkless homogeneous charge compression ignition (HCCI) mode. The internal combustion engine also includes a fuel vapor purge system fluidly coupled to the plurality of combustion cylinders, where the internal combustion engine is configured to operate in a first purge state, in which fuel vapors are permitted to be received from the fuel vapor purge system only into combustion cylinders that are operating in the spark ignition mode, and in a second purge state, in which fuel vapors are permitted to be received from the fuel vapor purge system into combustion cylinders operating in the spark ignition mode and into combustion cylinders operating in the HCCI mode. Such an engine provides the benefits of multiple combustion modes while making efficient use of evaporated fuel vapors. Further, it is possible to reduce uncertainties in auto-ignition timing, thereby enabling improved HCCI operation.

According to another aspect, the present description provides for an internal combustion engine having a plurality of combustion cylinders and a fuel delivery system. The plurality of combustion cylinders are configured to receive a mixture of gasoline and air and combust such mixture, where some of the combustion cylinders are configured to operate in a spark ignition mode, with the remaining cylinders being configured to operate in a compression ignition mode. The fuel delivery system is configured to supply gasoline to the combustion cylinders, and includes a fuel vapor purging system configured to selectively control delivery of evaporated fuel vapors from a fuel vapor purge source to the combustion cylinders. Furthermore, the fuel vapor purging system is configured to operate in a first purge mode in which evaporated fuel vapors are permitted to be drawn from the fuel vapor purge source into less than all of the combustion cylinders. This configuration similarly provides the benefits of multiple combustion modes while effectively handling the purge issues raised by multiple ignition modes and the presence of a compression ignition mode.

DETAILED DESCRIPTION

Figure 1:
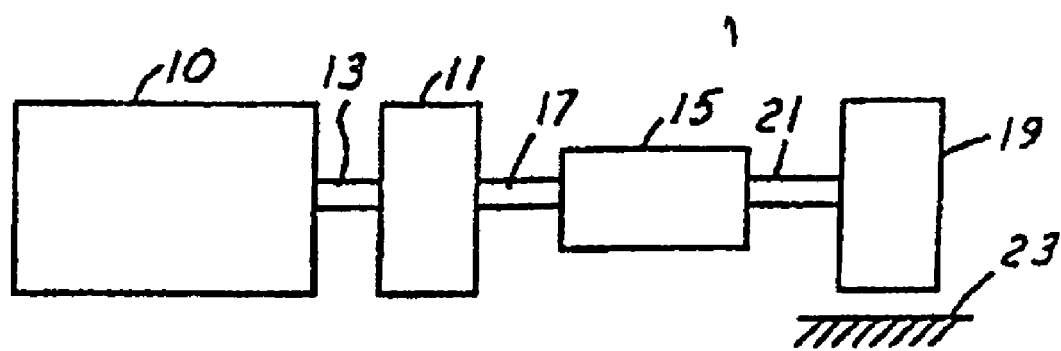
FIG. 1 is a block diagram of a vehicle illustrating various components of the powertrain system.
Figure 1A:
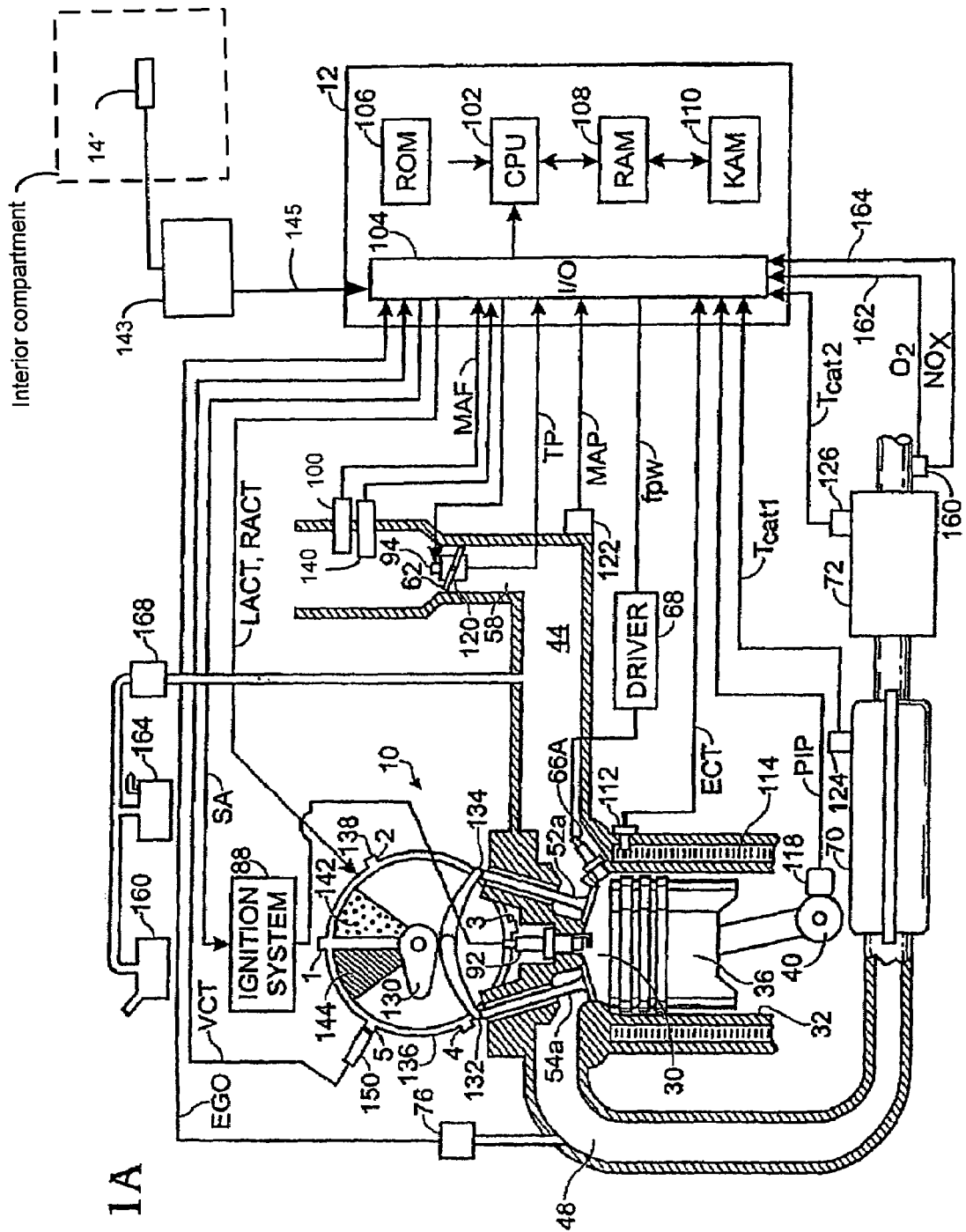
FIGS. 1A and 1B show a partial engine view.
Figure 1B:
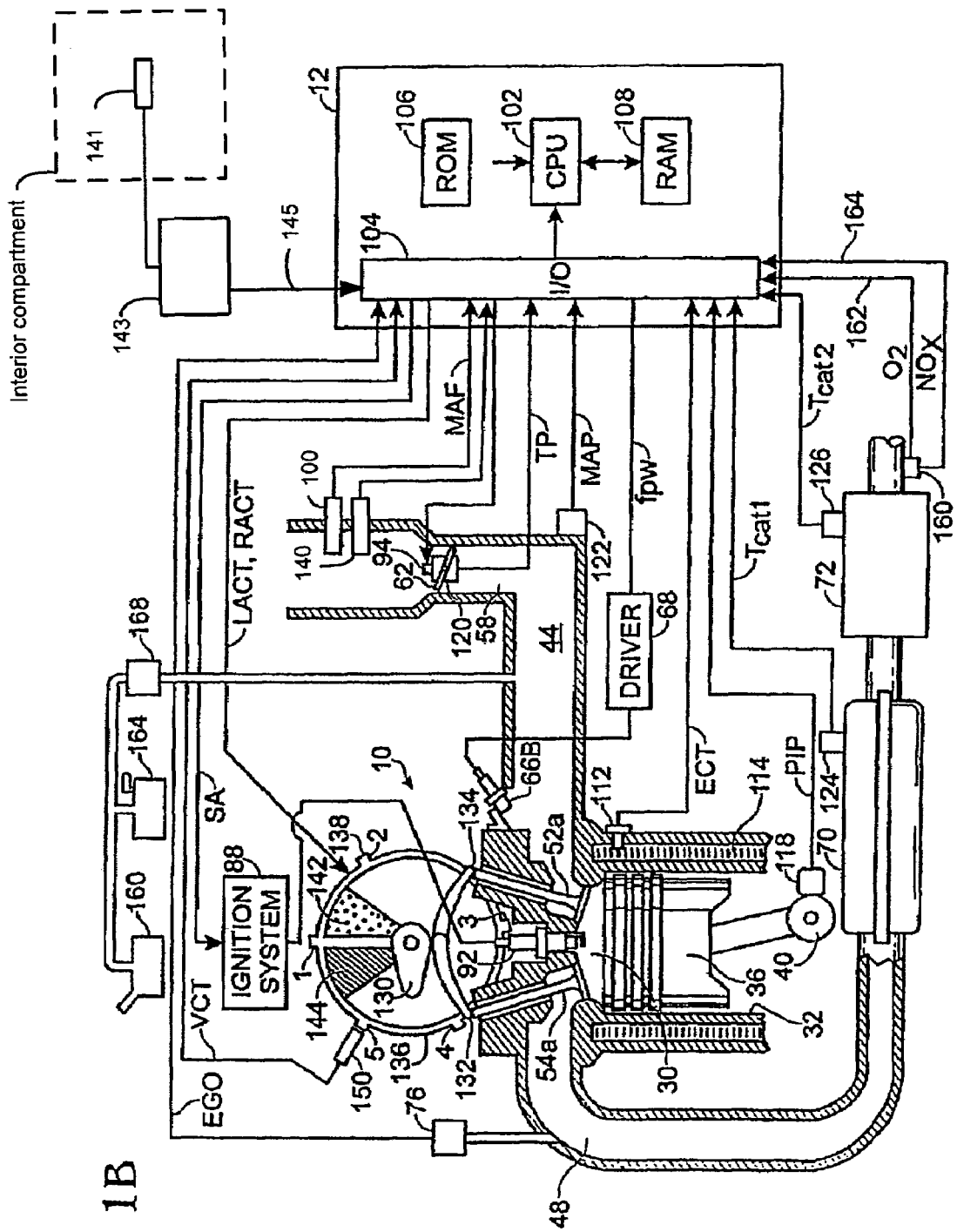

Referring to FIG. 1, internal combustion engine 10, further described herein with particular reference to FIGS. 1A and 1B, are shown coupled to torque converter 11 via crankshaft 13. Torque converter 11 is also coupled to transmission 15 via turbine shaft 17. Torque converter 11 has a bypass, or lock-up clutch 14 which can be engaged, disengaged, or partially engaged. When the clutch is either disengaged or partially engaged, the torque converter is said to be in an unlocked state. The lock-up clutch 14 can be actuated electrically, hydraulically, or electro-hydraulically, for example. The lock-up clutch 14 receives a control signal (not shown) from the controller, described in more detail below. The control signal may be a pulse width modulated signal to engage, partially engage, and disengage, the clutch based on engine, vehicle, and/or transmission operating conditions. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23. Note that in one example embodiment, this powertrain is coupled in a passenger vehicle that travels on the road.

FIGS. 1A and 1B show one cylinder of a multi-cylinder engine, as well as the intake and exhaust path connected to that cylinder. As described later herein with particular reference to FIG. 2, there are various configurations of the cylinders and exhaust system, as well as various configuration for the fuel vapor purging system and exhaust gas oxygen sensor locations.

Continuing with FIG. 1A, direct injection internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In this particular example, piston 36 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. Note that sensor 76 corresponds to various different sensors, depending on the exhaust configuration as described below with regard to FIG. 2. Sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12. Though spark ignition components are shown, engine 10 (or a portion of the cylinders thereof) may be operated in a compression ignition mode, with or without spark assist, as explained in more detail below.

Controller 12 may be configured to cause combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contain a stoichiometric mixture or a mixture slightly rich of stoichiometry, and subsequent strata contain progressively leaner mixtures. During the homogeneous spark-ignition mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel ratio being a function of the amount of fuel delivered to combustion chamber 30. An additional split mode of operation wherein additional fuel is injected during the exhaust stroke while operating in the stratified mode is also possible.

Nitrogen oxide (NOx) adsorbent or trap 72 is shown positioned downstream of catalytic converter 70. NOx trap 72 is a three-way catalyst that adsorbs NOx when engine 10 is operating lean of stoichiometry. The adsorbed NOx is subsequently reacted with HC and CO and catalyzed when controller 12 causes engine 10 to operate in either a rich homogeneous mode or a near stoichiometric homogeneous mode such operation occurs during a NOx purge cycle when it is desired to purge stored NOx from NOx trap 72, or during a vapor purge cycle to recover fuel vapors from fuel tank 160 and fuel vapor storage canister 164 via purge control valve 168, or during operating modes requiring more engine power, or during operation modes regulating temperature of the omission control devices such as catalyst 70 or NOx trap 72. It will be understood that various different types and configurations of emission control devices and purging systems may be employed.

Controller 12 is shown in FIG. 1A as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give and indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature Tcat1 of catalytic converter 70 and temperature Tcat2 of emission control device 72 (which can be a NOx trap) are inferred from engine operation as disclosed in U.S. Pat. No. 5,414,994, the specification of which is incorporated herein by reference. In an alternate embodiment, temperature Tcat1 is provided by temperature sensor 124 and temperature Tcat2 is provided by temperature sensor 126.

Continuing with FIG. 1A, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144.

By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

As discussed in more detail below, various different combustion modes may be employed in connection with the engine embodiments discussed herein. It may be desirable to vary valve operation both within a given combustion mode, and in connection with transitions between combustion modes. To vary valve lift, timing and/or other aspects of valve operation, various methods/structures may be employed in addition to or instead of the variable cam timing arrangement discussed above, including cam profile switching, and electromechanical or electro-hydraulic valve actuation (EVA).

Sensor 160 provides an indication of both oxygen concentration in the exhaust gas as well as NOx concentration. Signal 162 provides controller a voltage indicative of the $O_2$ concentration while signal 164 provides a voltage indicative of NOx concentration. Alternatively, sensor 160 can be a HEGO, UEGO, EGO, or other type of exhaust gas sensor. Also note that, as described above with regard to sensor 76, sensor 160 can correspond to various different sensors depending on the system configuration.

As described above, FIGS. 1A (and 1B) merely show one cylinder of a multi-cylinder engine, and that each cylinder has its own set of intake/exhaust valves, fuel injectors, spark plugs, etc.

Referring now to FIG. 1B, a port fuel injection configuration is shown where fuel injector 66B is coupled to intake manifold 44, rather than directly to cylinder 30.

It will be appreciated that the examples of FIGS. 1A and 1B are but two examples, and that many other engine configurations are possible. For example, instead of the cam mechanisms discussed above, intake and exhaust valves (e.g., intake valves 52a, 52b and exhaust valves 54a, 54b) may be actuated electromechanically or electrohydraulically.

Also, in the example embodiments described herein, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. In this near stoichiometric operating mode, the engine is operated within approximately one air-fuel ratio of the stoichiometric air-fuel ratio. This oscillatory operation is typically on the order of 1 Hz, but can vary faster and slower than 1 Hz. Further, the amplitude of the oscillations are typically within 1 a/f ratio of stoichiometry, but can be greater than 1 a/f ratio under various operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) is adjusted based on a desired air-fuel ratio and the air-fuel ratio from the sensor. Further still, individual cylinder air-fuel ratio control could be used, if desired.

Also note that various methods can be used to maintain the desired torque such as, for example, adjusting ignition timing, throttle position, variable cam timing position, exhaust gas recirculation amount, and a number of cylinders carrying out combustion. Further, these variables can be individually adjusted for each cylinder to maintain cylinder balance among all the cylinder groups.

Humidity sensing may also be employed in connection with the depicted embodiments. For example, an absolute, or relative, humidity sensor 140 is shown for measuring humidity of the ambient air. This sensor can be located either in the inlet air stream entering manifold 44, or measuring ambient air flowing through the engine compartment of the vehicle. Further, in an alternative embodiment, a second humidity sensor (141) is shown which is located in the interior of the vehicle and coupled to a second controller 143 that communicates with controller 12 via line 145. The control processes described below herein can be located in controller 12, or controller 143, or a combination thereof. Further note that the interior humidity sensor can be used in a climate control system that controls the climate in the passenger compartment of the vehicle. Specifically, it can be used to control the air-conditioning system, and more specifically, whether to enable or disable the air-conditioning compressor clutch which couples the compressor to the engine to operate the compressor.

As will be described in more detail below, combustion in engine 10 can be of various types/modes, depending on operating conditions. In one example, spark ignition (SI) can be employed where the engine utilizes a sparking device, such as spark plug coupled in the combustion chamber, to regulate the timing of combustion of combustion chamber gas at a predetermined time after top dead center of the expansion stroke. In one example, during spark ignition operation, the temperature of the air entering the combustion chamber is considerably lower than the temperature required for autoignition. While SI combustion may be utilized across a broad range of engine load and speed it may produce increased levels of NOx and lower fuel efficiency when compared with other types of combustion.

Another type of combustion that may be employed by engine 10 uses homogeneous charge compression ignition (HCCI), where autoignition of combustion chamber gases occurs at a predetermined point after the compression stroke of the combustion cycle, or near top dead center of compression. Typically when HCCI combustion is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Further, fuel efficiency while operating in a compression combustion mode may be increased by reducing the engine pumping loss, increasing the gas specific heat ratio, and by utilizing a higher compression ratio.

In compression ignition operation mode, it will often be desirable to exercise close control over the timing of autoignition. The initial intake charge temperature directly affects the timing of autoignition. The start of ignition is not directly controlled by an event such as the injection of fuel in the standard diesel engine or the sparking of the spark plug in the spark ignited engine. Furthermore, the heat release rate is not controlled by either the rate or duration of the fuel-injection process, as in the diesel engine, or by the turbulent flame propagation time, as in the spark-ignited engine.

Note that autoignition is also phenomena that may cause knock in a spark-ignited engine. Knock is undesirable in spark-ignited engines because it enhances heat transfer within the cylinder and may burn or damage the piston. In an HCCI engine, with its high air-to-fuel ratio, knock does not generally cause degradation of the engine because the diluted charge keeps the maximum temperature of the burned gases relatively low.

In comparison to a spark ignition engine, the temperature of the charge at the beginning of the compression stroke typically must be increased to reach auto-ignition conditions at or near the end of the compression stroke. It will be appreciated by those skilled in the art that numerous other methods may be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbocharging and supercharging), and heating the intake air charge (external EGR).

During HCCI combustion, autoignition of the combustion chamber gas is controlled to occur at a desired position of the piston to generate desired engine torque, and thus it may not be necessary to initiate a spark from a sparking mechanism to achieve combustion. However, a late timing of the spark plug, after an autoignition temperature should have been attained, may be utilized as a backup ignition source in the case that autoignition does not occur.

A third type of combustion that may be performed by engine 10 utilizes a sparking device to initiate (or assist) combustion when the temperature of the combustion chamber gas approaches an autoignition temperature (e.g., reaches a level substantially near autoignition without achieving combustion). Such a spark assist type of combustion can exhibit increased fuel efficiency and reduce NOx production over that of SI combustion, yet may operate in a higher load range than compared with HCCI combustion. Spark assist may also offer an overall larger window for controlling temperature at a specified timing in the engine cycle. In other words, without spark assistance a small change in temperature may result in a rather large change in combustion timing, thus affecting engine output and performance. In the spark assist mode, it is possible to attain many of the benefits of HCCI combustion, but to rely on spark timing to provide the final energy needed to attain autoignition and thus more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate autoignition of the remaining air/fuel mixture. Thus, a relatively small cloud of richer gases may be used that are proximate to the spark plug, which can also be homogeneous, stratified, or slightly stratified. One approach to provide such operation may be to utilize a second direct fuel injection in the compression stroke.

One example of an application involving at least the three combustion modes presented above may include the use of SI for startup and/or after engine startup during an engine warming period. After such engine startup and engine warming, the combustion process may transition through spark assist combustion to HCCI combustion for improved fuel economy and emissions. During periods of high engine load requirements, spark assist may be activated to ensure proper combustion timing. As the engine is returned to a low or moderate load requirement, the involvement of spark assist may cease in order to realize the full benefits of HCCI.

The ambient humidity of air drawn into the engine during the intake stroke directly affects peak combustion temperatures. As the ambient humidity of the air drawn into the engine during the intake stroke increases, the peak combustion temperature is decreased via dilution of the charge with material that cannot be oxidized and subsequently raises the required initial charge temperature to attain efficient HCCI combustion. The ambient or relative humidity can be determined using sensors 140 and/or 141 or may be inferred from other data and passed on to engine controller 12 to determine the ideal adjustments to engine control parameters for efficient operation. Note that a plurality of other parameters affects both the peak combustion temperature and the required peak temperature for efficient HCCI combustion. These and any other applicable parameters may be accounted for in the routines embedded in engine controller 12 and may be used to determine optimum operating conditions. For example, as the octane rating of the fuel increases, the required peak combustion temperature may increase as the fuel requires a higher peak combustion temperature to achieve ignition. Also, the level of charge dilution may be affected by a variety of factors including both humidity and the amount of exhaust gases present in the intake charge. As charge dilution increases, the effective compression ratio also increases and thusly, the minimum required intake charge temperature may be decreased.

Figure 2A:
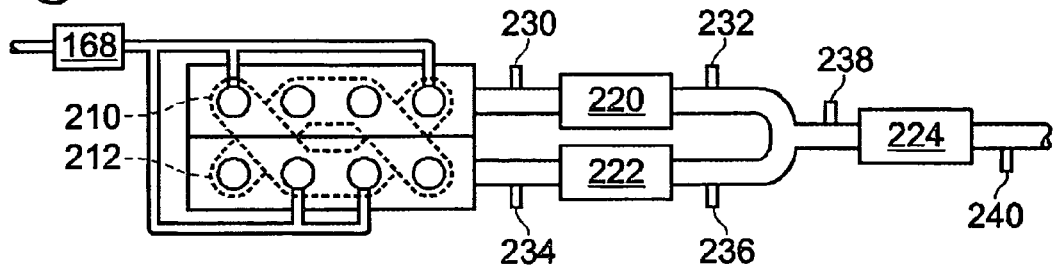
FIGS. 2A-2U show various schematic configurations.

Referring now to FIG. 2A, a first example configuration is described using a V-8 engine, although this is simply one example, since a V-10, V-12, 14, 16, etc., could also be used. Note that while numerous exhaust gas oxygen sensors are shown, a subset of these sensors can also be used. Further, only a subset of the emission control devices can be used, and a non-y-pipe configuration can also be used. As shown in FIG. 2A, some cylinders of first combustion chamber group 210 are coupled to the first catalytic converter 220, while the remainders are coupled to catalyst 222. Upstream of catalyst 220 and downstream of the first cylinder group 210 is an exhaust gas oxygen sensor 230. Downstream of catalyst 220 is a second exhaust gas sensor 232. In this example, groups 210 and 212 each have four cylinders. However, either group 210 or group 212 could be divided into other groups, such as per cylinder bank. This would provide four cylinder groups (two on each bank, each with two cylinders in the group). In this way, two different cylinder groups can be coupled to the same exhaust gas path on one side of the engine's bank.

Similarly, some cylinders of second combustion chamber group 212 are coupled to a second catalyst 222, while the remainders are coupled to catalyst 220. Upstream and downstream are exhaust gas oxygen sensors 234 and 236 respectively. Exhaust gas spilled from the first and second catalyst 220 and 222 merge in a Y-pipe configuration before entering downstream under body catalyst 224. Also, exhaust gas oxygen sensors 238 and 240 are positioned upstream and downstream of catalyst 224, respectively.

In one example embodiment, catalysts 220 and 222 are platinum and rhodium catalysts that retain oxidants when operating lean and release and reduce the retained oxidants when operating rich. Further, these catalysts can have multiple bricks, and further these catalysts can represent several separate emission control devices.

Similarly, downstream underbody catalyst 224 also operates to retain oxidants when operating lean and release and reduce retained oxidants when operating rich. As described above, downstream catalyst 224 can be a group of bricks, or several emission control devices. Downstream catalyst 224 is typically a catalyst including a precious metal and alkaline earth and alkaline metal and base metal oxide. In this particular example, downstream catalyst 224 contains platinum and barium.

Note that various other emission control devices could be used, such as catalysts containing palladium or perovskites. Also, exhaust gas oxygen sensors 230 to 240 can be sensors of various types. For example, they can be linear oxygen sensors for providing an indication of air-fuel ratio across a broad range. Also, they can be switching type exhaust gas oxygen sensors that provide a switch in sensor output at the stoichiometric point. Also, the system can provide less than all of sensors 230 to 240, for example, only sensors 230, 234, and 240. In another example, only sensor 230, 234 are used with only devices 220 and 222. Also, while FIG. 2A shows a V-8 engine, various other numbers of cylinders could be used. For example, an I4 engine can be used, where there are two groups of two cylinders leading to a common exhaust path with and upstream and downstream emission control device.

When the system of FIG. 2A is operated in an AIR/LEAN mode, first combustion group 210 is operated at a lean air-fuel ratio (typically leaner than about 18:1) and second combustion group 212 is operated without fuel injection. Thus, in this case, and during this operation, the exhaust air-fuel ratio is a mixture of air from the cylinders without injected fuel, and a lean air fuel ratio from the cylinders combusting a lean air-fuel mixture. In this way, fuel vapors from valve 168 can be burned in group 210 cylinders even during the AIR/LEAN mode.

Figure 2B:
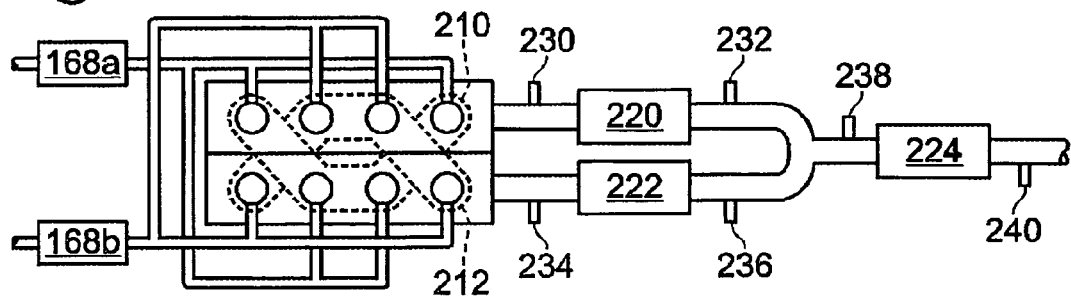

Referring now to FIG. 2B, a system similar to that in FIG. 2A is shown, however a dual fuel vapor purge system is shown with first and second purge valves 168A and 168B. Thus, independent control of fuel vapors between each of groups 210 and 212 is provided. When the system of FIG. 2B is operated in an AIR/LEAN mode, first combustion group 210 is operated at a lean air-fuel ratio (typically leaner than about 18:1), second combustion group 212 is operated without fuel injection, and fuel vapor purging can be enabled to group 210 via valve 168A (and disabled to group 212 via valve 168B). Alternatively, first combustion group 210 is operated without fuel injection, second combustion group 212 is operated at a lean air-fuel ratio, and fuel vapor-purging can be enabled to group 212 via valve 168B (and disabled to group 210 via valve 168A). In this way, the system can perform the AIR/LEAN mode in different cylinder groups depending on operating conditions, or switch between the cylinder groups to provide even wear, etc.

Figure 2C:
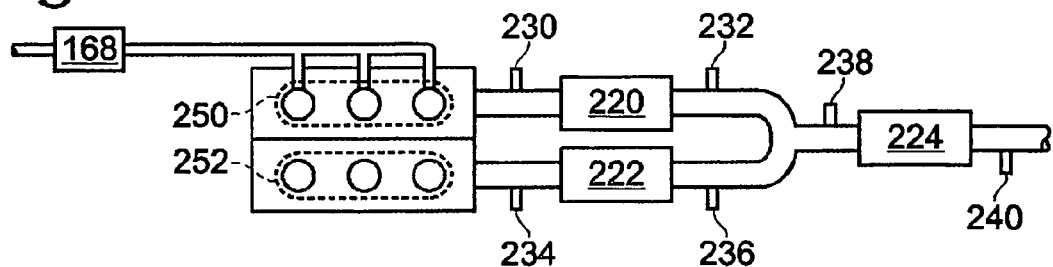

Referring now to FIG. 2C, a V-6 engine is shown with first group 250 on one bank, and second group 252 on a second bank. The remainder of the exhaust system is similar to that described above in FIGS. 2A and 2B. The fuel vapor purge system has a single control valve 168 fed to cylinders in group 250.

When the system of FIG. 2C is operated in an AIR/LEAN mode, first combustion group 250 is operated at a lean air-fuel ratio (typically leaner than about 18:1) and second combustion group 252 is operated without fuel injection. Thus, in this case, and during this operation, the exhaust air-fuel ratio is a mixture of air from the cylinders without injected fuel, and a lean air fuel ratio from the cylinders combusting a lean air-fuel mixture. In this way, fuel vapors from valve 168 can be burned in group 250 cylinders even during the AIR/LEAN mode.

Figure 2D:
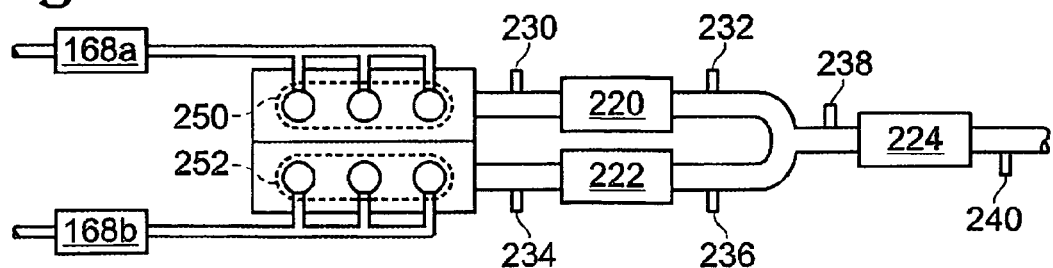

Referring now to FIG. 2D, a system similar to that in FIG. 2C is shown, however a dual fuel vapor purge system is shown with first and second purge valves 168A and 168B. Thus, independent control of fuel vapors between each of groups 250 and 252 is provided. When the system of FIG. 2D is operated in an AIR/LEAN mode, first combustion group 250 is operated at a lean air-fuel ratio (typically leaner than about 18:1), second combustion group 252 is operated without fuel injection, and fuel vapor purging can be enabled to group 250 via valve 168A (and disabled to group 212 via valve 168B). Alternatively, first combustion group 250 is operated without fuel injection, second combustion group 252 is operated at a lean air-fuel ratio, and fuel vapor purging can be enabled to group 252 via valve 168B (and disabled to group 250 via valve 168A). In this way, the system can perform the AIR/LEAN mode in different cylinder groups depending on operating conditions, or switch between the cylinder groups to provide even wear, etc.

Figure 2E:
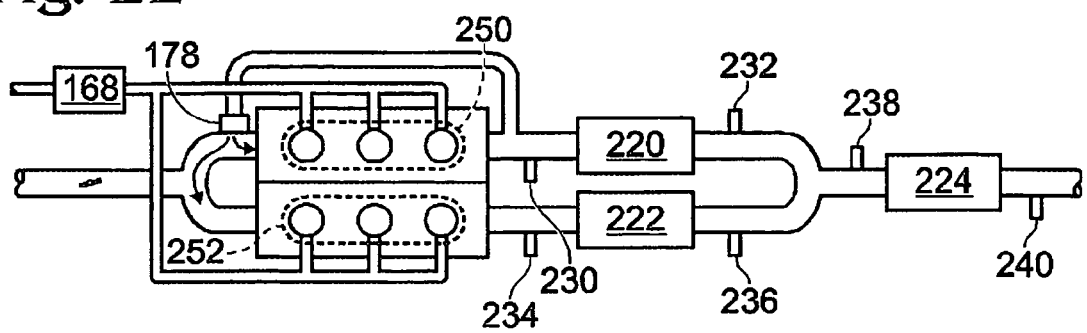

Referring now to FIG. 2E, a V-6 engine is shown similar to that of FIG. 2C, with the addition of an exhaust gas recirculation (EGR) system and valve 178. As illustrated in FIG. 2E, the EGR system takes exhaust gasses exhausted from cylinders in cylinder group 250 to be fed to the intake manifold (downstream of the throttle). The EGR gasses then pass to both cylinder groups 250 and 252 via the intake manifold. The remainder of the exhaust system is similar to that described above in FIGS. 2A and 2B.

Figure 2F:
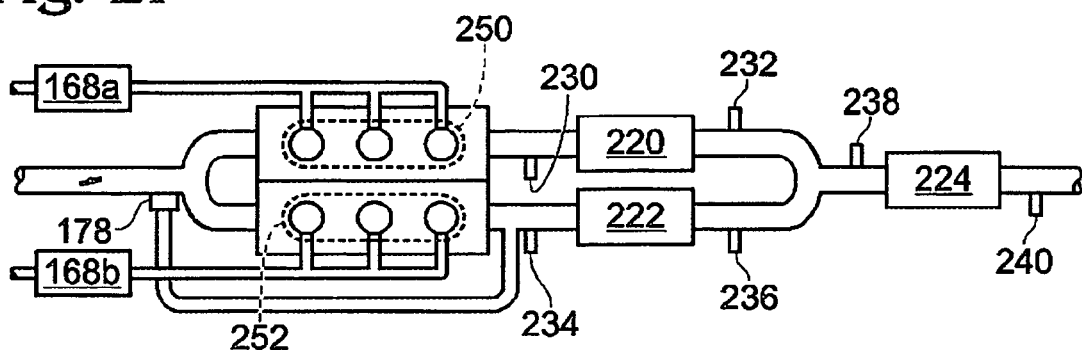

Referring now to FIG. 2F, a system similar to that in FIG. 2E is shown, however a dual fuel vapor purge system is shown with first and second purge valves 168A and 168B. Further, EGR gasses are taken from group 252, rather than 250.

Figure 2G:
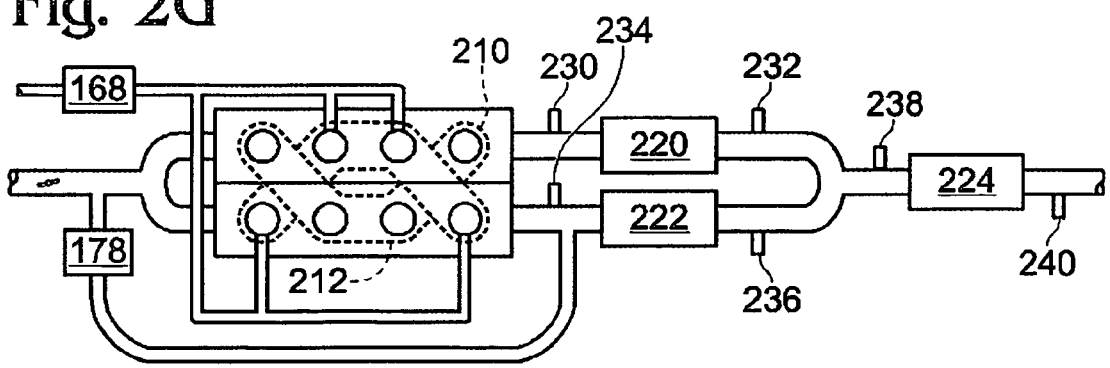

Referring now to FIG. 2G, a system similar to that in FIG. 2A is shown, however an exhaust gas recirculation system and valve 178 is shown for introducing exhaust gasses that are from some cylinders in group 210 and some cylinders in group 212 into the intake manifold downstream of the throttle valve.

Figure 2H:
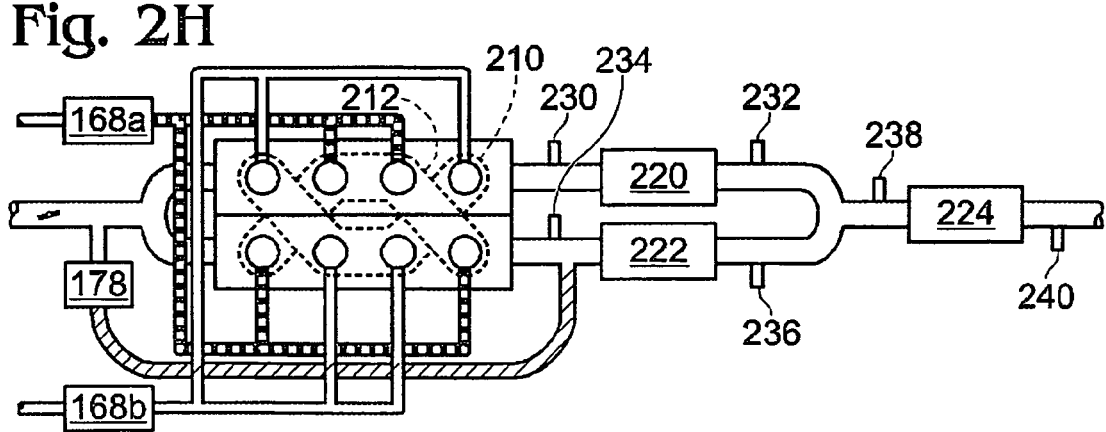

Referring now to FIG. 2H, a system similar to that in FIG. 2G is shown, however a dual fuel vapor purge system is shown with first and second purge valves 168A and 168B.

Figure 2I:
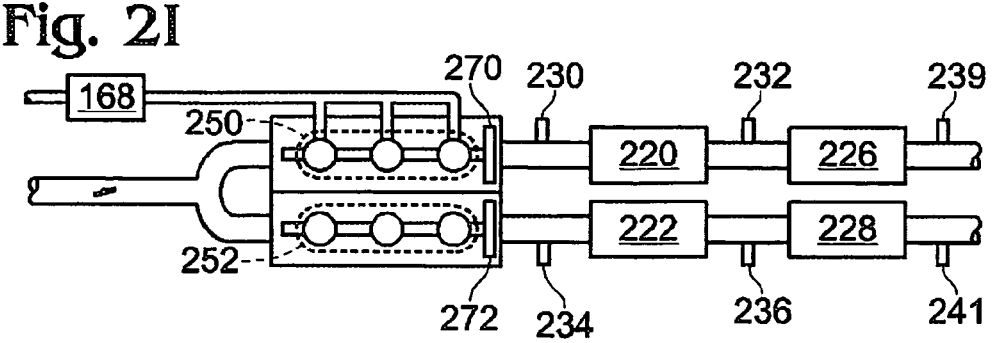

Referring now to FIG. 2I, a V-6 engine is shown with first cylinder group 250 on a first bank, and second cylinder group 252 on a second bank. Further, a first exhaust path is shown coupled to group 250 including an upstream emission control device 220 and a downstream emission control device 226. Further, an exhaust manifold sensor 230, an intermediate sensor 232 between devices 220 and 226, and a downstream sensor 239 are shown for measuring various exhaust gas air-fuel ratio values. In one example, devices 220 and 226 are three way catalysts having one or more bricks enclosed therein. Similarly, a second exhaust path is shown coupled to group 252 including an upstream emission control device 222 and a downstream emission control device 228. Further, an exhaust manifold sensor 234, an intermediate sensor 236 between devices 222 and 228, and a downstream sensor 241 are shown for measuring various exhaust gas air-fuel ratio values. In one example, devices 222 and 228 are three way catalysts having one or more bricks enclosed therein.

Continuing with FIG. 2I, both groups 250 and 252 have a variable valve actuator (270 and 272, respectively) coupled thereto to adjust operation of the cylinder intake and/or exhaust valves. In one example, these are variable cam timing actuators as described above in FIGS. 1A and 1B. However, alternative actuators can be used, such as variable valve lift, or switching cam systems. Further, individual actuators can be coupled to each cylinder, such as with electronic valve actuator systems.

Note that FIG. 2I, as well as the rest of the figures in FIG. 2 are schematic representations. For example, the purge vapors from valve 168 can be delivered via intake ports with inducted air as in FIG. 2J, rather than via individual paths to each cylinder in the group as in FIG. 2I.

Figure 2J:
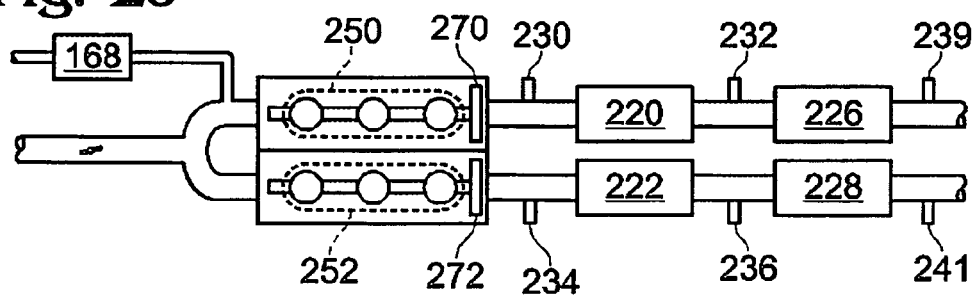

Referring now to FIG. 2J, a system similar to that of FIG. 2I is shown with an alternative fuel vapor purge delivery to the intake manifold, which delivery fuel vapors from valve 168. Note that such a system can be adapted for various systems described in FIG. 2 above and below, as mentioned with regard to FIG. 2I, although one approach may provide advantages over the other depending on the operating modes of interest.

Figure 2K:
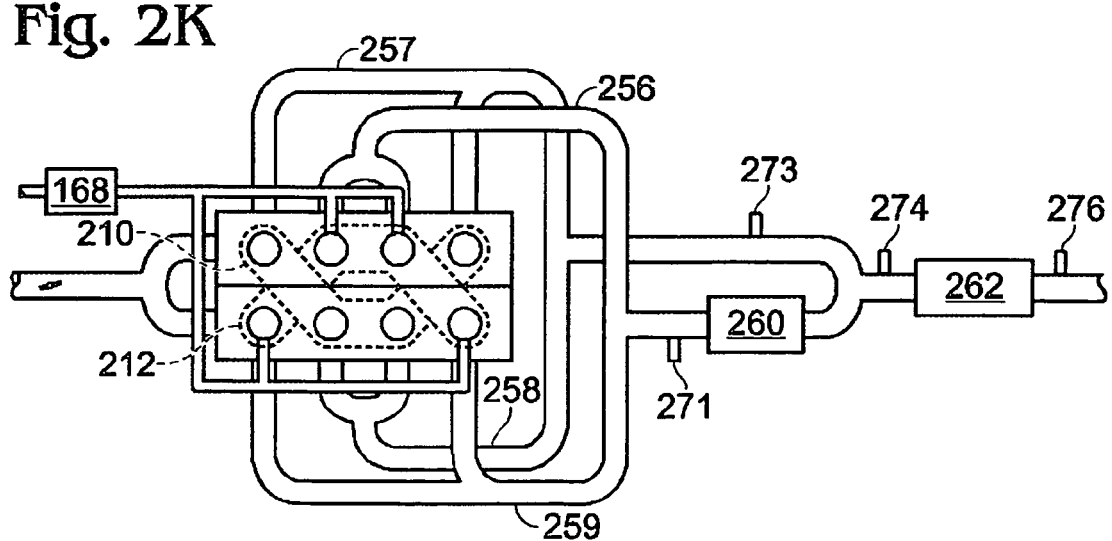

Referring now to FIG. 2K, a V-8 engine is shown with a first group of cylinders 210 spanning both cylinder banks, and a second group of cylinders 212 spanning both cylinder banks. Further, an exhaust system configuration is shown which brings exhaust gasses from the group 212 together before entering an emission control device 260. Likewise, the gasses exhausted from device 260 are mixed with untreated exhaust gasses from group 210 before entering emission control device 262. This is accomplished, in this example, via a cross-over type exhaust manifold. Specifically, exhaust manifold 256 is shown coupled to the inner two cylinders of the top bank of group 212; exhaust manifold 257 is shown coupled to the outer two cylinders of the top bank of group 210; exhaust manifold 258 is shown coupled to the inner two cylinders of the bottom bank of group 210; and exhaust manifold 259 is shown coupled to the outer two cylinders of the bottom bank of group 212. Then, manifolds 257 and 258 are fed together and then fed to mix with gasses exhausted from device 250 (before entering device 262), and manifolds 256 and 259 are fed together and fed to device 260. Exhaust gas air-fuel sensor 271 is located upstream of device 260 (after manifolds 256 and 259 join). Exhaust gas air-fuel sensor 273 is located upstream of device 262 before the gasses from the group 210 join 212. Exhaust gas air-fuel sensor 274 is located upstream of device 262 after the gasses from the group 210 join 212. Exhaust gas air-fuel sensor 276 is located downstream of device 276.

In one particular example, devices 260 and 262 are three way catalysts, and when the engine operates in a partial fuel cut operation, group 212 carries out combustion oscillating around stoichiometry (treated in device 260), while group 210 pumps are without injected fuel. In this case, device 262 is saturated with oxygen. Alternatively, when both cylinder groups are combusting, both devices 260 and 262 can operate to treat exhausted emissions with combustion about stoichiometry. In this way, partial cylinder cut operation can be performed in an odd fire V-8 engine with reduced noise and vibration.

Note that there can also be additional emission control devices (not shown), coupled exclusively to group 210 upstream of device 262.

Figure 2L:
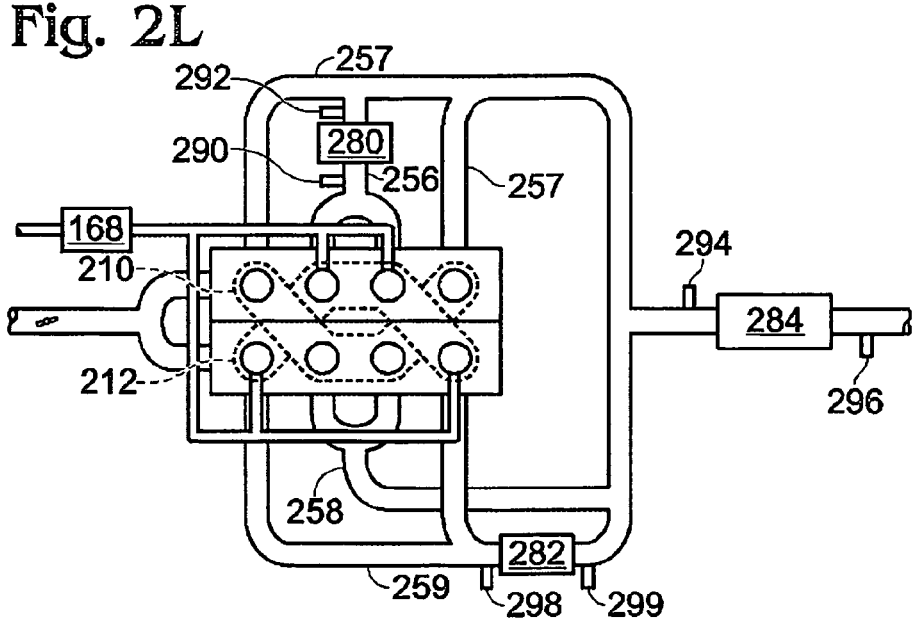

Referring now to FIG. 2L, another V-8 engine is shown with a first group of cylinders 210 spanning both cylinder banks, and a second group of cylinders 212 spanning both cylinder banks. However, in this example, a first emission control device 280 is coupled to two cylinders in the top bank (from group 212) and a second emission control device 282 is coupled to two cylinders of the bottom bank (from group 212). Downstream of device 280, manifold 257 joins exhaust gasses from the remaining two cylinders in the top bank (from group 210). Likewise, downstream of device 282, manifold 258 joins exhaust gasses from the remaining two cylinders in the bottom bank (from group 210). Then, these two gas streams are combined before entering downstream device 284.

In one particular example, devices 280, 282, and 284 are three way catalysts, and when the engine operates in a partial fuel cut operation, group 212 carries out combustion oscillating around stoichiometry (treated in devices 280 and 282), while group 210 pumps are without injected fuel. In this case, device 284 is saturated with oxygen. Alternatively, when both cylinder groups are combusting, devices 280, 282, and 284 can operate to treat exhausted emissions with combustion about stoichiometry. In this way, partial cylinder cut operation can be performed in an odd fire V-8 engine with reduced noise and vibration.

Note that both FIGS. 2K and 2L show a fuel vapor purge system and valve 168 for delivering fuel vapors to group 210.

Figure 2M:
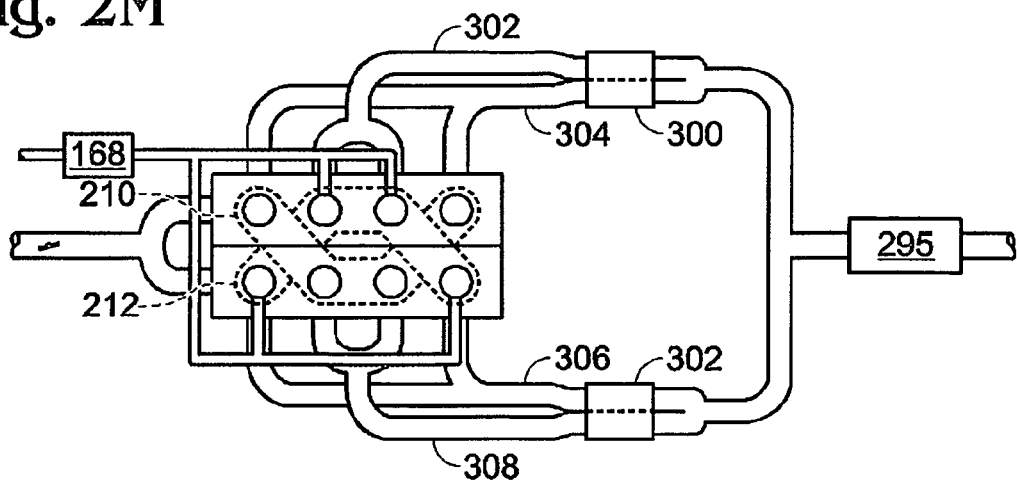

Referring now to FIG. 2M, two banks of a V8 engine are shown. The odd fire V8 engine is operated by, in each bank, running two cylinders about stoichiometry and two cylinders with air. The stoichiometric and air exhausts are then directed through a bifurcated exhaust pipe to a bifurcated metal substrate catalyst. The stoichiometric side of the catalyst reduces the emissions without the interference from the air side of the exhaust. The heat from the stoichiometric side of the exhaust keeps the whole catalyst above a light-off temperature during operating conditions. When the engine is then operated in 8-cylinder mode, the air side of the catalyst is in light-off condition and can reduce the emissions. A rich regeneration of the air side catalyst can also be performed when changing from 4 to 8 cylinder mode whereby the 2 cylinders that were running air would be momentarily operated rich to reduce the oxygen storage material in the catalyst prior to returning to stoichiometric operation. This regeneration can achieve 2 purposes: 1) the catalyst will function in 3-way operation when the cylinders are brought back to stoichiometric operation and 2) the regeneration of the oxygen storage material will result in the combustion of the excess CO/H2 in the rich exhaust and will raise the temperature of the catalyst if it has cooled during period when only air was pumped through the deactivated cylinders.

Continuing with FIG. 2M, exhaust manifold 302 is shown coupled to the inner two cylinders of the top bank (from group 212). Exhaust manifold 304 is shown coupled to the outer two cylinders of the top bank (from group 210). Exhaust manifold 308 is shown coupled to the inner two cylinders of the bottom bank (from group 210). Exhaust manifold 306 is shown coupled to the outer two cylinders of the bottom bank (from group 212). Exhaust manifolds 302 and 304 are shown leading to an inlet pipe (305) of device 300. Likewise, exhaust manifolds 306 and 308 are shown leading to an inlet pipe (307) of device 302. The exhaust gasses from devices 300 and 302 are mixed individually and then combined before entering device 295. Further, a fuel vapor purge system and control valve 168 are shown delivering fuel vapors to group 212.

Again, as discussed above, an I-4 engine could also be used, where the engine has a similar exhaust and inlet configuration to one bank of the V-8 engine configurations shown above and below in the various Figures.

Figure 2N:
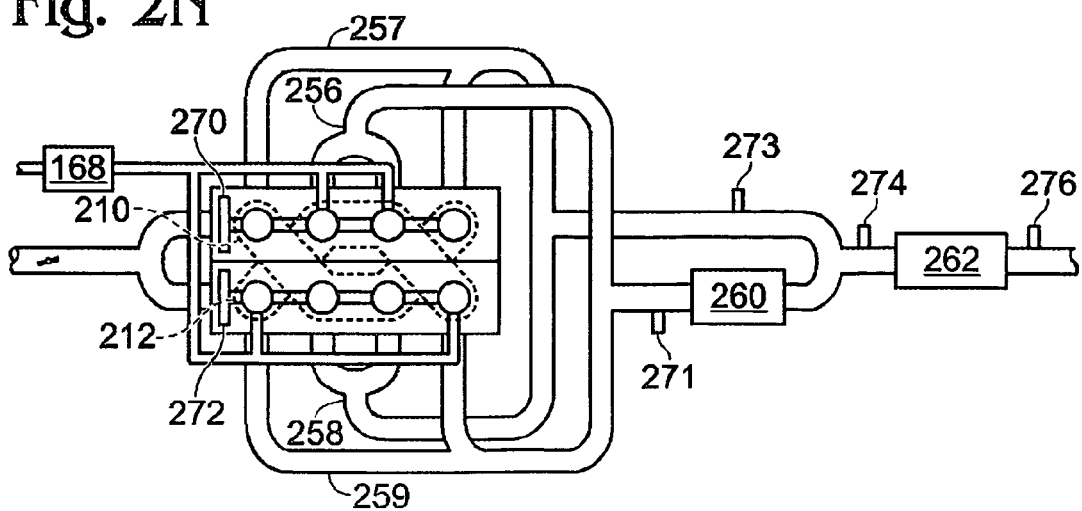
Figure 2O:
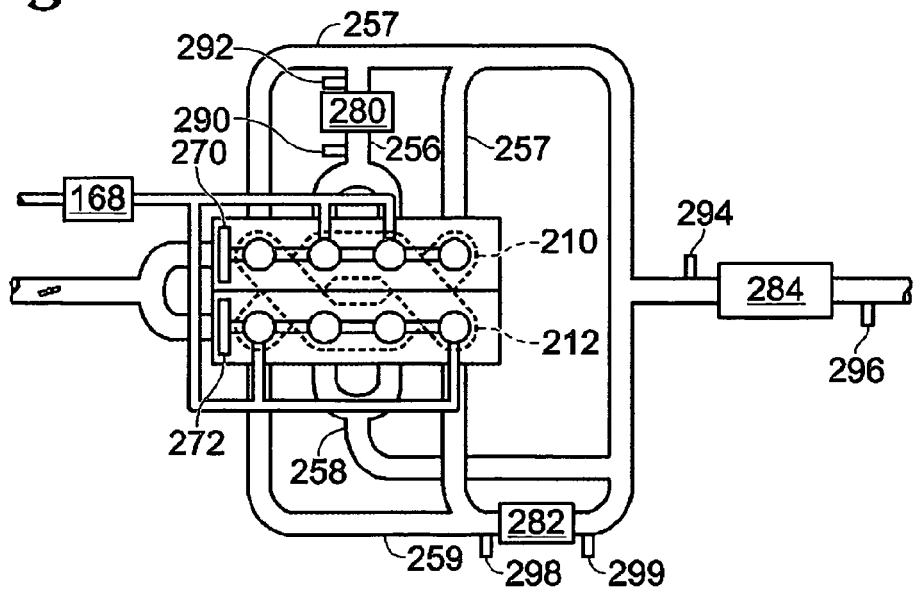
Figure 2P:
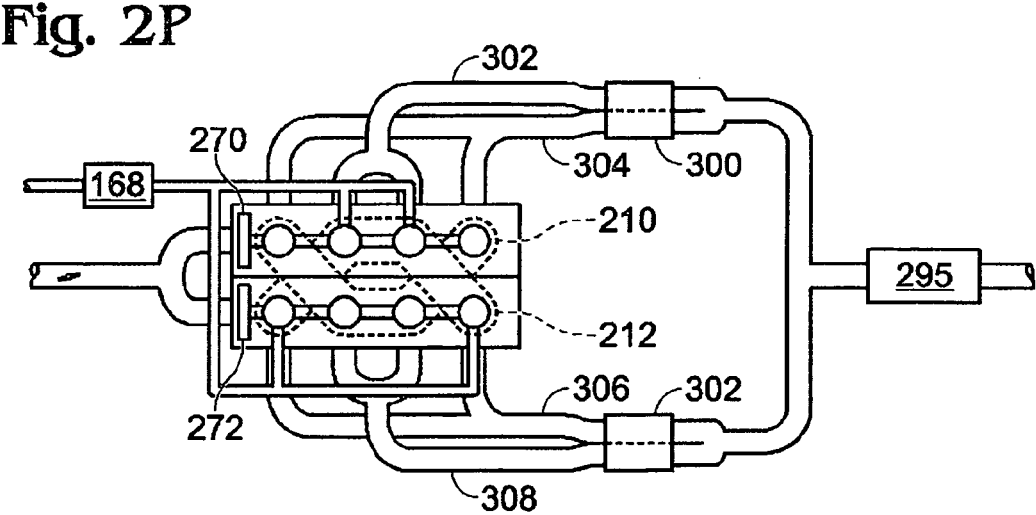

FIGS. 2N, 2O, and 2P are similar to FIGS. 2K, 2L, and 2M, respectively, except for the addition of a first and second variable valve actuation units, in this particular example, variable cam timing actuators 270 and 272.

Figure 2Q:
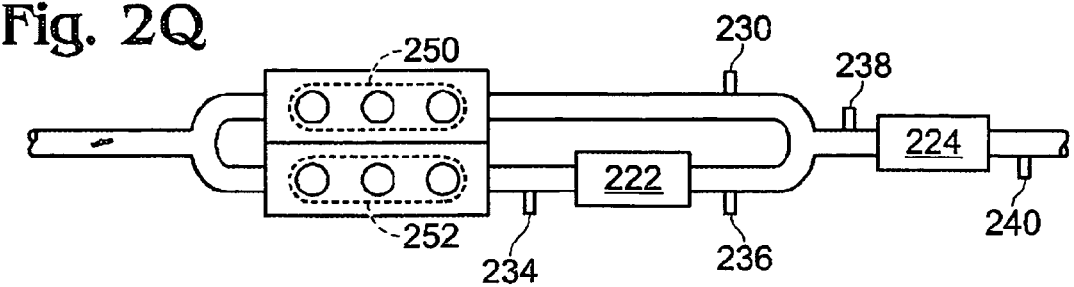

Referring now to FIG. 2Q, an example V-6 engine is shown with emission control devices 222 and 224. In this example, there is no emission control device coupled exclusively to group 250. A third emission control device (not shown) can be added downstream. Also, FIG. 2Q shows an example V-6 engine, however, others can be used in this configuration, such as a V-10, V-12, etc.

Figure 2R:
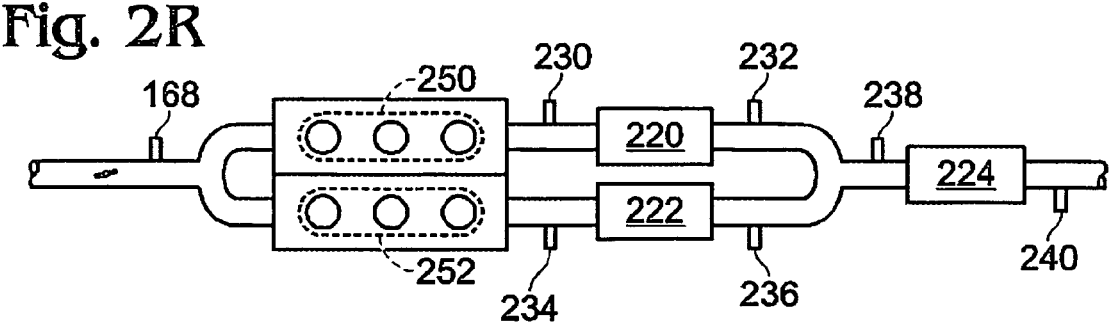

Referring now to FIG. 2R, an example system is shown where fuel vapors are passed to all of the cylinders, and in the case of cylinder fuel cut operation, fuel vapor purging operating is suspended.

Figure 2S:
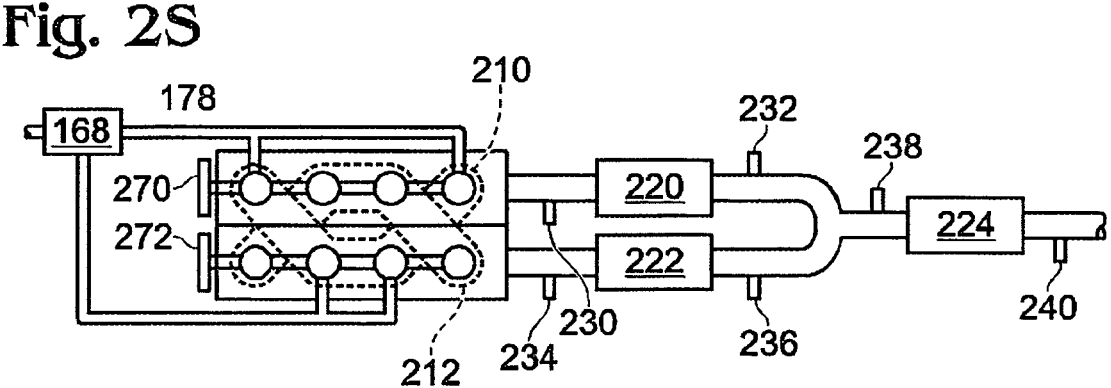
Figure 2T:
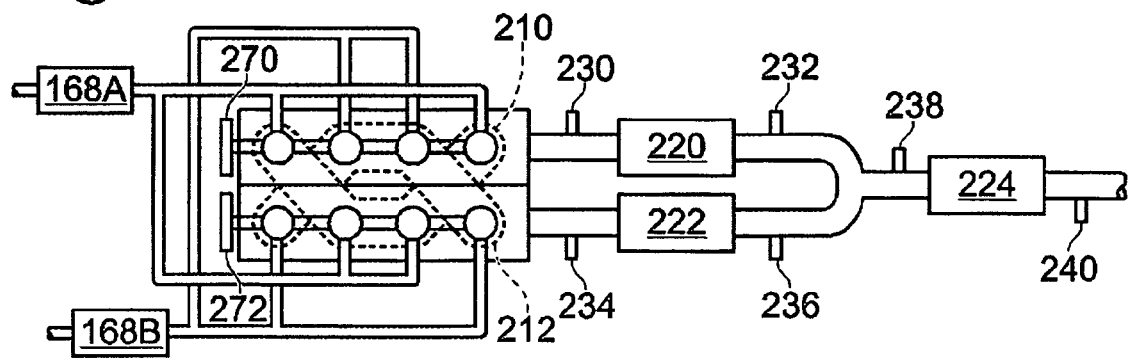

Referring now to FIGS. 2S and 2T, still another example system is shown for an engine with variable valve operation (such as variable cam timing from devices 270 and 272), along with a fuel vapor purging system having a single valve 168 in 2S, and dual purge valves 168A,B in 2T.

There are various fuel vapor modes for FIGS. 2A-2T, some of which are listed below:

operate the first group of cylinders lean with fuel vapor purge (and injected fuel), and the other group inducting gasses without injected fuel operate the first group of cylinders stoichiometric with fuel vapor purge (and injected fuel), and the other group inducting gasses without injected fuel operate the first group of cylinders rich with fuel vapor purge (and injected fuel), and the other group inducting gasses without injected fuel operate the first group of cylinders lean with fuel vapor purge (and injected fuel), and the other group stoichiometric without fuel vapors operate the first group of cylinders stoichiometric with fuel vapor purge (and injected fuel), and the other group stoichiometric without fuel vapors operate the first group of cylinders rich with fuel vapor purge (and injected fuel), and the other group stoichiometric without fuel vapors operate the first group of cylinders lean with fuel vapor purge (and injected fuel), and the other group lean without fuel vapors operate the first group of cylinders stoichiometric with fuel vapor purge (and injected fuel), and the other group lean without fuel vapors operate the first group of cylinders rich with fuel vapor purge (and injected fuel), and the other group lean without fuel vapors operate the first group of cylinders lean with fuel vapor purge (and injected fuel), and the other group rich without fuel vapors operate the first group of cylinders stoichiometric with fuel vapor purge (and injected fuel), and the other group rich without fuel vapors operate the first group of cylinders rich with fuel vapor purge (and injected fuel), and the other group rich without fuel vapors operate the first group of cylinders lean with fuel vapor purge (and injected fuel), and the other group rich with fuel vapors (and injected fuel)

operate the first group of cylinders stoichiometric with fuel vapor purge (and injected fuel), and the other group rich with fuel vapors (and injected fuel)

operate the first group of cylinders rich with fuel vapor purge (and injected fuel), and the other group rich with fuel vapors (and injected fuel)

operate the first group of cylinders lean with fuel vapor purge (and injected fuel), and the other group lean with fuel vapors (and injected fuel)

operate the first group of cylinders stoichiometric with fuel vapor purge (and injected fuel), and the other group lean with fuel vapors (and injected fuel)

operate the first group of cylinders rich with fuel vapor purge (and injected fuel), and the other group lean with fuel vapors (and injected fuel)

operate the first group of cylinders lean with fuel vapor purge (and injected fuel), and the other group stoichiometric with fuel vapors (and injected fuel)

operate the first group of cylinders stoichiometric with fuel vapor purge (and injected fuel), and the other group stoichiometric with fuel vapors (and injected fuel)

operate the first group of cylinders rich with fuel vapor purge (and injected fuel), and the other group stoichiometric with fuel vapors (and injected fuel)

Each of these modes can include further variation, such as different VCT timing between cylinder banks, etc. Also note that operation at a cylinder cut condition provides a practically infinite air-fuel ratio, since substantially no fuel is being injected by the fuel injectors for that cylinder (although there may be some fuel present due to fuel around the intake valves and in the intake port that will eventually decay away). As such, the effective air-fuel ratio is substantially greater than about 100:1, for example. Although, depending on the engine configuration, it could vary between 60:1 to practically an infinite value.

Regarding the various systems shown in FIGS. 2A-R, different system configurations can present their own challenges that are addressed herein. For example, V-8 engines, such as in FIG. 2A, for example, can have uneven firing order, so that if it is desired to disable a group of 4 cylinders, then two cylinders on each bank are disabled to provide acceptable vibration. However, this presents challenges since, as shown in FIG. 2A, some exhaust system configurations treat emissions from the entire bank together. Further, as shown in FIGS. 2S-2T, a single valve actuator can be used to adjust all of the valves of cylinders in a bank, even though some cylinders in the bank are disabled, while others are operating. Unlike such V-8 engines, some V-6 engines can be operated with a cylinder bank disabled, thus allowing an entire cylinder bank to be a group of cylinders that are operated without fuel injection. Each of these different types of systems therefore has its own potential issues and challenges, as well as advantages, as discussed and addressed by the routines described in more detail below.

Figure 2U:
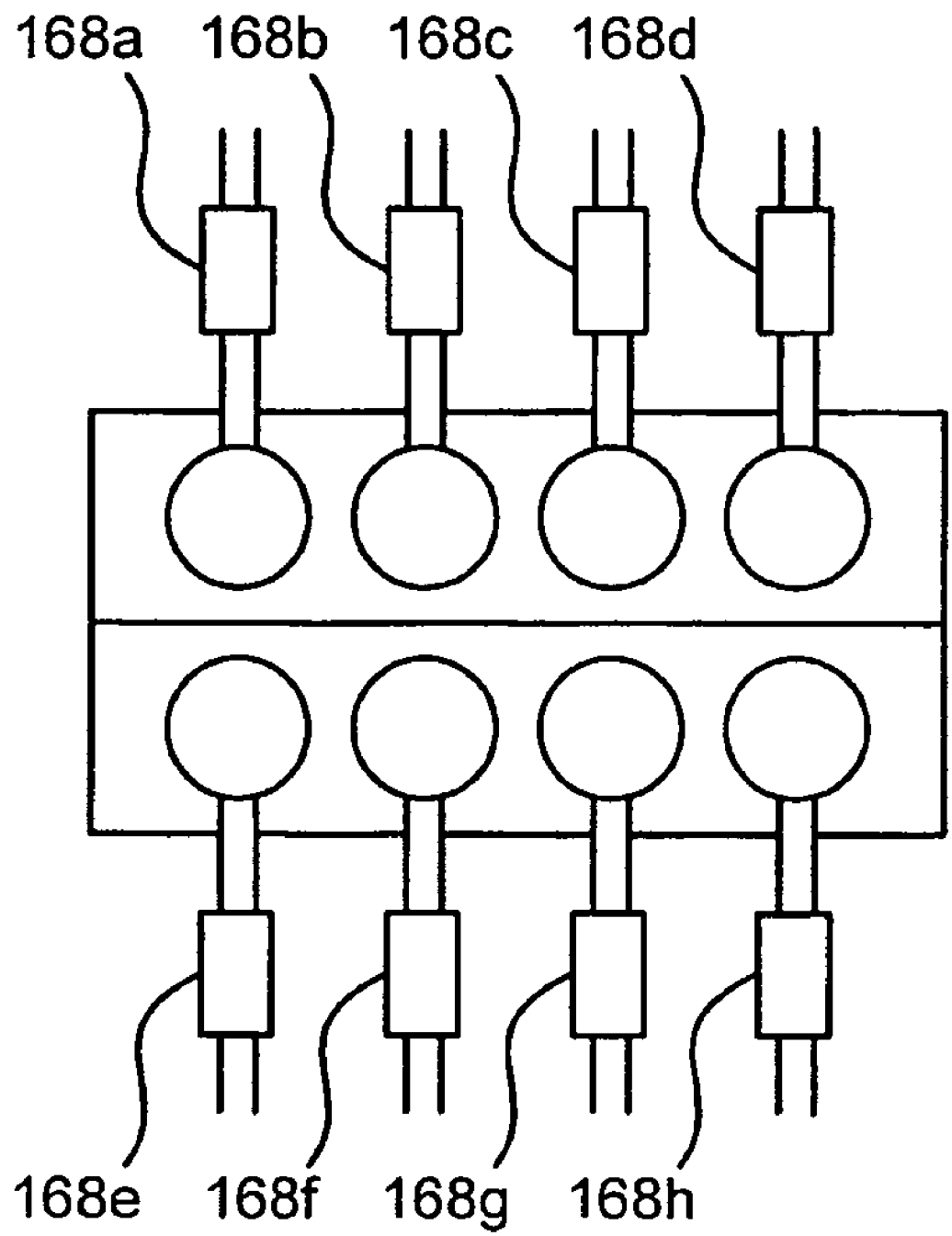

Also regarding the various systems shown in FIGS. 2A-T, various purge topologies and methods are shown. FIGS. 2A, 2C, 2G, 2I, 2K, 2L, 2M, 2N, 2O, 2P and 2S show, for example, a purge configuration in which a single group of cylinders is selectively provided with fuel vapor purge via a purge valve common to the cylinders in the group. FIGS. 2B, 2D, 2F, 2H and 2T show two separate purge valves, under independent and selective control, that supply purged vapors to two separate cylinder groups. FIGS. 2E, 2J and 2R show a common purge valve coupled with all cylinders. In addition, regardless of the particular engine configuration (14, 16, V8, V12, etc.) it may be desirable to provide a separate and independently controllable purge valve for each combustion cylinders. FIG. 2U schematically depicts an exemplary V8 configuration in which each cylinder is coupled with a separately controllable purge valve 168.

Note a bifurcated induction system (along firing order groups) can also be used for the fresh air. Such a system would be similar to the system of FIG. 2T, except that the valves 168A and 168B would be replaced by electronically controlled throttles. In this way, fuel vapor purge could be fed to these two bifurcated induction systems, along with airflow, so that separate control of fuel vapor purge and airflow could be achieved between groups 210 and 212. However, as discussed above with regard to FIGS. 2I and 2J, for example, the VCT actuators can be used to obtain differing airflows (or air charges) between the cylinders of groups 250 and 252, without requiring a split induction system.

Several control strategies may be used to take advantage of the ability to provide differing air amounts to differing cylinder groups, as discussed in more detail below. As one example, separate control of airflow to different cylinder groups (e.g., via VCT actuators 270 and 272 in FIGS. 2I and 2J), can be used in split ignition operation to allow more (or less) air flow into a group of cylinders. Also, under some conditions there may be no one air amount that satisfies requirements of combustion stability, heat generation, and net power/torque. For example, the power producing cylinder group may have a minimum spark advance for stability, or the heat producing cylinder group may have a maximum heat flux due to material constraints. Bank-VCT and/or bifurcated intake could be used to achieve these requirements with different air amounts selected for different cylinder groups.

Another control strategy example utilizing a bifurcating inlet (or using VCT in a V6 or V10) would allow lower pumping losses in cylinder cut-out mode by changing the air flow to that group, where VCT is not solely associated with a firing group.

Further details of control routines are included below which can be used with various engine configurations, such as those described in FIGS. 2A-2T. As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12.

In addition to the above features relating to purge, airflow/air-fuel control and aftertreatment, it may be desirable to employ configurations in which cylinders are capable of changing to different combustion mode, in order to optimize performance/efficiency by taking maximal advantage of the benefits available from the different combustion modes. For example, under a certain set of operating conditions (e.g., engine speed/load, requested torque, desired fuel economy, etc.), it may be desirable to employ HCCI operation), while at other times, spark assist HCCI or normal spark ignition may be more advantageous. Accordingly, engine 10 may be configured so that its combustion cylinders can be operated in either spark mode or HCCI mode.

Nonetheless, the ability to switch between combustion modes may present various issues. Assuming a combustion mode transition can be effected, a temporary performance penalty may result from the transition. For example, in certain conditions, it may take a few combustion cycles for a cylinder set to fully switch over to the new mode of combustion. During the transition, those cylinders may create additional emissions issues and/or operate at a lower efficiency level. Sometimes, for other reasons, the benefits of the new combustion mode may not be immediately realized. For example, switching from HCCI (lean A/F ratio) to SI (stoichiometric) may require temporary rich operation to reset the catalyst of the aftertreatment system.

At other times, conditions are such that a mode transition cannot be performed. For example, SI and HCCI run at very different exhaust temperatures. During periods of prolonged HCCI operation, exhaust temperatures may not be high enough to maintain the catalyst at a high enough temperature to process SI emissions. Thus a transition to SI would have to be delayed (and the benefits of the transition would thus be delayed) until the catalyst was prepared for the transition (e.g., heated to an appropriate "light-off" temperature). Alternatively, a transition to SI mode may be performed well before the catalyst temperature drops below an acceptable level. Furthermore, these transition-related issues are often magnified by the fact that all of the combustion cylinders are transitioned to the other mode.

One way of addressing these issues is to create cylinder partitions, or groupings, in which a first partition/grouping of cylinders operates in one combustion mode (e.g., spark ignition), while another partition/grouping operates in another mode such as HCCI. For example, in a V-8 engine configuration, a first bank of four cylinders could be dedicated to HCCI operation, with the remaining bank running in spark ignition mode. Such a configuration, however, may be limited in flexibility and not appropriate for all operating conditions. The strengths and shortcomings of such a configuration flow from the properties inherent to each combustion mode: the spark mode bank would operate with markedly lower fuel efficiency, but with greater torque range/capacity, while the HCCI bank would provide higher fuel efficiency, but over a limited range of engine speed/load. The permanent allocation of four cylinders to each mode would, in some cases, limit the ability to optimize the blend of advantages available from each mode of operation.

Accordingly, various embodiments may be configured to enable flexible allocations of combustion modes among the cylinders, such that, at different times, a different number of cylinders would be operating in each combustion mode. In these configurations, some or all of the combustion cylinders are configured to be operated in multiple combustion modes (e.g., in spark ignition and HCCI mode; in spark ignition, HCCI and spark assist modes; etc.).

Note that the example control and estimation routines included herein can be used with various engine and/or hybrid powertrain configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Figure 3:
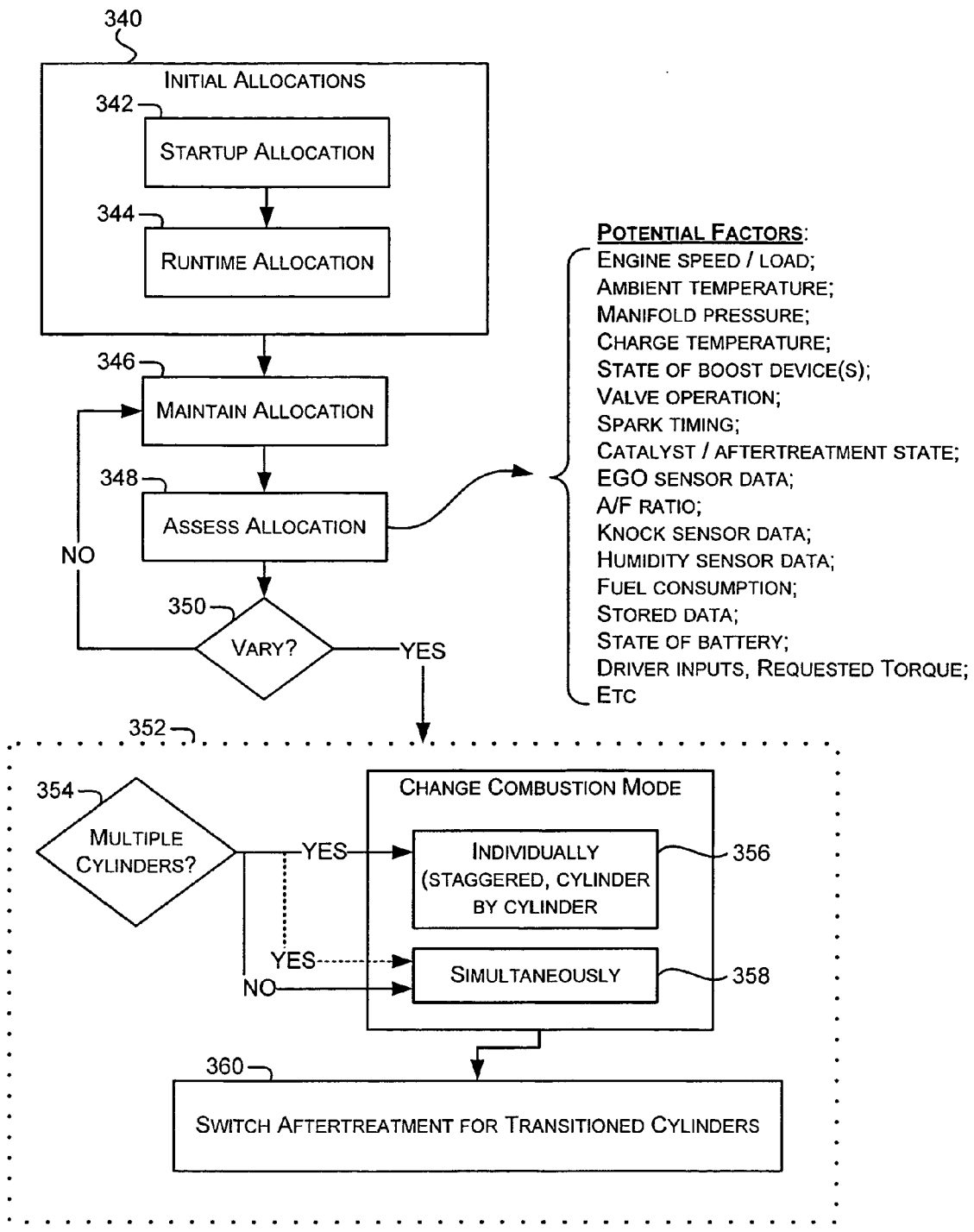
FIG. 3 is a flowchart showing example routines and methods.

FIG. 3 depicts an exemplary method of operating an internal combustion having cylinders that may be flexibly allocated into different combustion modes of operation. At 340, the method includes establishing an initial allocation 342 of combustion modes. This may include, for example, setting all cylinders to operate initially in spark ignition mode, since HCCI operation typically must be postponed until elevated charge temperatures can be obtained. Thus, at cold start for a V-8 engine, all eight cylinders could be allocated to operate in spark ignition mode. Alternatively, variable displacement methodologies could be employed, such that only a portion of the cylinders would be operated at startup and during idle, with the remaining cylinders being placed into a deactivated mode.

After startup, an initial run-time allocation may be employed, as shown at 344. The run-time allocation may be preconfigured at design time, may be established based on adaptation to driver behavior, set during aftermarket modification, etc. In any case, the initial run-time allocation might involve half the cylinders running in HCCI mode, with the other half operating in spark ignition mode. Alternatively, an unequal allocation could be employed, or all of the cylinders could be placed into the same combustion mode.

It will be appreciated that certain conditions and/or engine operating parameters correspond to each combustion mode. In HCCI, for example, charge temperatures must be controlled so that combustion is initiated at the desired time. Typically, this involves a higher charge temperature than is used in SI operation. Heat exchangers, changes to valve operation, boosting, etc. may be employed to obtain the elevated charge temperature. Also, different A/F ratios are employed, and aftertreatment systems/methods may be different. These are but a few examples, as is appreciated in the art, many operating conditions/parameters vary between the different combustion modes.

At 346, the method includes maintaining the established mode allocation, while at 348, an assessment of the current mode allocation is performed. Assessment 348 may include any factor or combination of factors that is pertinent to operation of the engine. These factors may include engine speed; engine load; ambient temperature; charge temperature; exhaust temperature; current valve operation; state of battery (in HEV-enabled configurations); state/temperature of catalyst; state of boost device(s), if any; data from EGO sensors, humidity sensor, knock sensor, and/or any other sensors; A/F ratio; fuel consumption/efficiency; driver inputs such as requested torque; spark timing; etc.

Assessment 348 is performed in order to determine whether the current allocation is providing the desired level of performance and an optimal blend of the advantages that are provided by the available combustion modes. The assessment may indicate that a change to the allocation is needed, as show at 350. Such a change may involve transitioning the combustion mode for one or more cylinders to a different mode, as shown at 352. The assessment may also include determining whether a potential reallocation may somehow be postponed or avoided. For example, if the driver has requested more torque than can be efficiently provided by the existing allocation over a sustained period, a determination may be made as to whether an alternate torque source, such as a battery in HEV-enabled systems, may be employed. Temporary use of the battery could be employed in such a situation to delay the reallocation of cylinders. Alternatively, if the elevated torque request was relatively short in duration, the torque supplied from the battery might be sufficient to avoid the reallocation altogether. If a re-allocation is not needed, or if it can be delayed or avoided, the current allocation is maintained at 346, and further assessment is performed at 348 as operation continues.

If a reallocation is in order, various actions may be performed to provide smooth combustion mode transitions, so as to minimize performance penalties, and/or avoid torque discontinuities, NVH and other undesirable effects. For example, as shown at 354, if the reallocation involves multiple cylinders, the cylinders can be switched one at a time, in a staggered manner, as shown at 356, in order to minimize the transition issues. Alternatively, all of the cylinders may be switched at the same time, as shown at 358, if desired. In any case, additional actions may be performed in connection with smoothing combustion mode transitions. For example, subsequent or prior to the combustion mode change at 356 and 358, torque holes or surpluses, may be avoided through use of boosting devices, batteries or other energy storage devices, or through other torque sources and/or torque absorbers. For example, if a certain transition is known to produce an immediate torque surge, various compensatory methods may be employed, such as charge dilution, spark timing variations, absorbing the torque with a battery, energy storage device, or other torque absorbing devices, etc. These methods may be employed at any appropriate time relative to the torque surge, in order to provide the desired smoothing. Similarly, for transitions that produce a temporary torque deficit, compensation may be obtained via an alternate torque source, such as a battery, via boosting, via generating additional torque with the non-transitioning cylinders, etc. As in the other example, the compensation may be performed at various times relative to the actual drop in torque.

In some embodiments, multiple aftertreatment systems may be provided, and the system may then be configured so that the multiple-mode cylinders can be selectively coupled to the different aftertreatment systems. For example, HCCI operation typically is quite lean in comparison to SI combustion, such that the combustion afterproducts vary substantially. Also, HCCI exhaust typically is lower in temperature than SI exhaust. In fact, HCCI exhaust temperatures can be lower than that which is optimal for maintaining a desired operating state of the types of catalysts used in SI aftertreatment. Accordingly, it will be desirable in certain embodiments to have separate aftertreatment systems.

Figure 4:
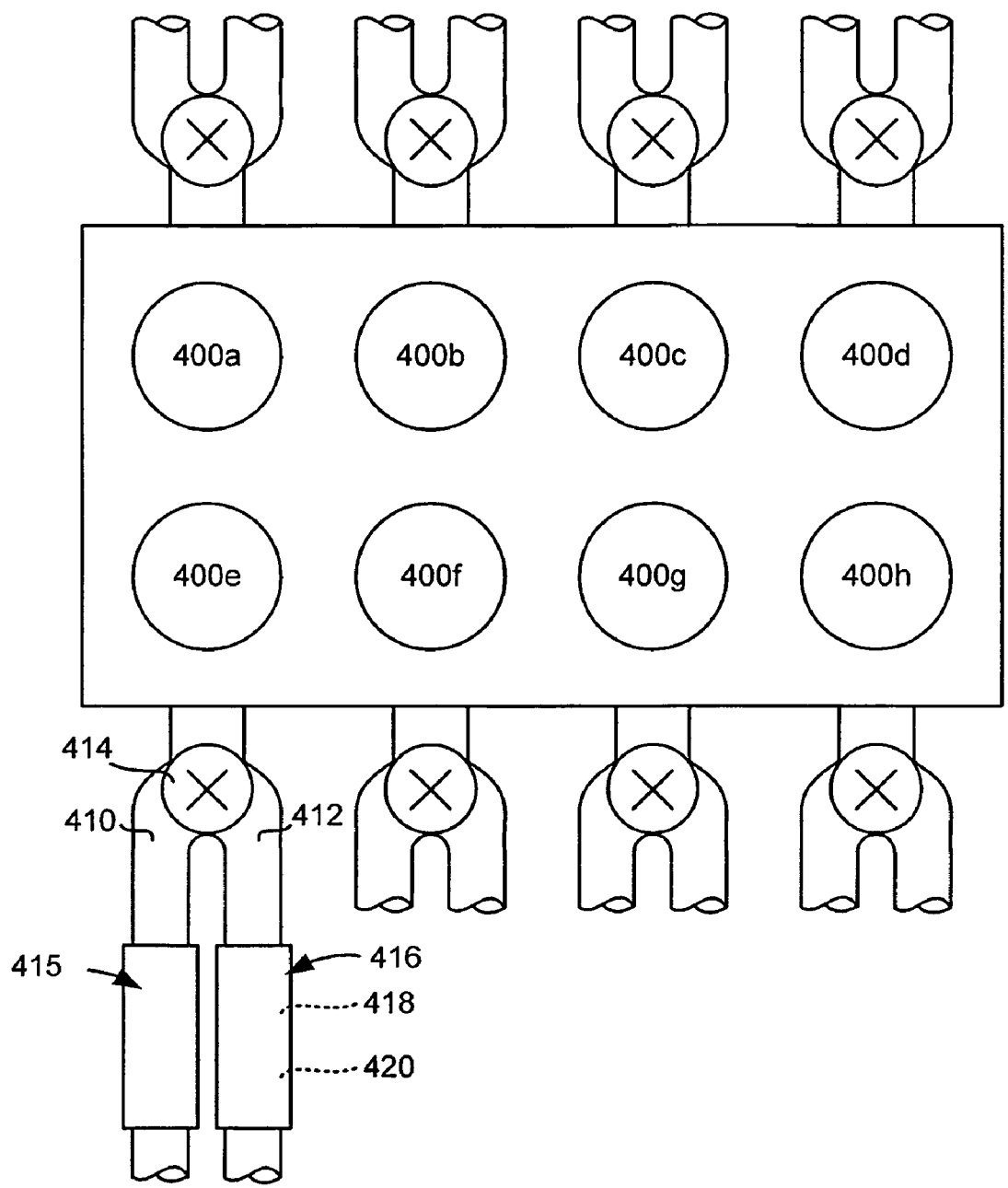
FIG. 4 shows another example schematic configuration.

An example of such a system is shown in FIG. 4. The figure schematically shows the combustion cylinders of an engine with a V-8 configuration. It should be appreciated, however, that the present discussion is applicable to a wide variety of engine configurations in which combustion cylinders are transitioned between different combustion modes.

As shown in the figure, each combustion cylinder 400 is fluidly coupled with two exhaust manifolds 410 and 412 (reference numbers shown on one cylinder only). Manifold 410 may correspond, for example, to HCCI operation, with manifold 412 being used during SI operation. Each cylinder may also be provided with an exhaust manifold switching mechanism 414, or the like, which is configured to direct the cylinder exhaust to the desired manifold.

Switching mechanism 414 may take a variety of forms. The mechanism may incorporate various structural features and/or operation of conventional exhaust valves, and/or may take additional forms. Each manifold may be provided with a separate valve whose operation is controlled via valve deactivation, cam profile switching, EVA actuation, and/or other methods/structures. Typically, all of the exhaust gases are directed into one manifold or the other, though it may be desirable in some cases to employ partial valve states in which a portion of the exhaust is directed into each manifold.

As shown in FIG. 4, each of the provided manifolds (in the present example, HCCI manifold 410 and SI manifold 412) may be coupled with an aftertreatment system appropriate to that type of combustion. Aftertreatment system 416 or SI manifold 412, for example, may include a three way catalyst 418 and/or a lean NOx trap 420. The HCCI manifold typically also will be provided with an aftertreatment system 415 appropriate to the cooler, leaner HCCI combustion. Typically the aftertreatment systems are connected in parallel to one another and are external to each other, such that a given volume of exhaust travels through one aftertreatment system or the other upon leaving the combustion cylinders, absent internal EGR or some other drawing of the exhaust back into the combustion cylinders.

In certain configurations/embodiments, the presence of multiple modes of combustion may be employed to further advantage. The higher exhaust temperatures present in the SI manifold 412, for example, may be employed to facilitate initiation of HCCI combustion which, as discussed above, typically requires an elevated charge temperature to initiate. Furthermore, to the extent that it is desirable to employ temperature-dependent devices in the HCCI aftertreatment system 415 (e.g., devices requiring a minimum temperature to function), the system may be positioned in proximity to the SI exhaust manifold so that it can draw the necessary heat from the SI manifold.

Thus, continuing with the method of FIG. 3, when re-allocation is effected, the exhaust system for a transitioned cylinder typically is also changed, as shown at 360. For example, if a cylinder is switched from SI to HCCI operation, the exhaust for that cylinder may be redirected from the SI to the HCCI exhaust manifold. The exhaust switching typically happens close in time to the change in combustion mode for the cylinder, though it may happen at other times, and may happen before, after or simultaneously with the transition in combustion modes.

It should be appreciated that the dynamic allocation systems and methods discussed herein may provide many advantages, depending on the particular embodiments that are employed. A typical advantage that is obtained is the flexible blending of benefits of the different available combustion modes. A fixed allocation or partition of cylinders is not required, such that varying numbers of combustion cylinders can be operated in the desired modes at any given time, in order to optimize performance, efficiency, etc. In a dynamic allocation system with SI and HCCI modes, there typically is not a need to reset catalysts in connection with mode transitions, because the SI manifold and aftertreatment system typically is supplied with stoichiometric feedgas most, if not all of the time. Mode transitions are less abrupt and easier to negotiate due to the fact that the flexible partitioning system allows cylinders to be switched over one at a time, rather than all at once.

As discussed above, many options and configurations for purging evaporated fuel vapors may be employed. Purging improves emissions by preventing evaporated fuel vapors from being automatically vented to atmosphere. Instead, a valve system allows fuel vapors to be sucked from the purge canister or storage area into the air/fuel intake area of the combustion cylinders. As such, fuel vapor purging typically entails an enrichment of the air fuel mixture being provided to the combustion cylinders. The A/F ratio typically is detected via operation of exhaust gas oxygen sensors positioned in the exhaust system, and the data from these sensors is used to provide closed-loop control over the fuel injection system, in order to account for the enrichment resulting from the purged fuel vapor.

The spark ignition mode is a fairly robust and stable combustion mode, and addition of purged vapors typically does not pose any complications beyond the need to monitor and control the air-fuel ratio, as discussed above. Nonetheless, there are times in spark ignition mode when it is desirable to significantly limit or turn off the vapor purging.

The presence of additional combustion modes, such as HCCI, can present issues relating to fuel vapor purging. Indeed, even setting aside the issue of vapor purging, HCCI generally raises control issues of higher complexity than those present with many other combustion modes. Unlike with SI combustion or diesel combustion, HCCI does not employ an external triggering event to initiate combustion, such as a spark or precisely timed fuel injection event. Instead, the key factor in initiating combustion is maintenance of an optimal temperature range for combustion charges. Charge temperature as the piston approaches TDC compression must be controlled to within a few degrees for optimal HCCI combustion.

Purging in HCCI can be complicated by the fact that during HCCI operation, manifold pressures are much higher than in SI operation. For this reason, and due to other factors, it can be difficult to use exhaust gas oxygen sensors to accurately determine the effect of fuel vapor purging on the air fuel ratio. If the air fuel ratio goes too rich during HCCI operation, combustion stability can be adversely affected and emissions may be produced that cannot be effectively handled by the aftertreatment systems.

Accordingly, it will be desirable in some situations to employ various different purging strategies and methodologies in embodiments employing multiple combustion modes, particularly embodiments in which HCCI is employed. The present disclosure and examples are applicable to a wide variety of settings in which multiple combustion modes are employed, including configurations and methods in which (1) all combustion cylinders simultaneously operate in the same mode, but can switch from one mode to another; (2) one cylinder or cylinders remains always in a certain combustion mode, while another cylinder or cylinders operates at all times in another combustion mode; and/or (3) where some or all combustion cylinders are capable of dynamically switching to different combustion modes.

Figure 5:
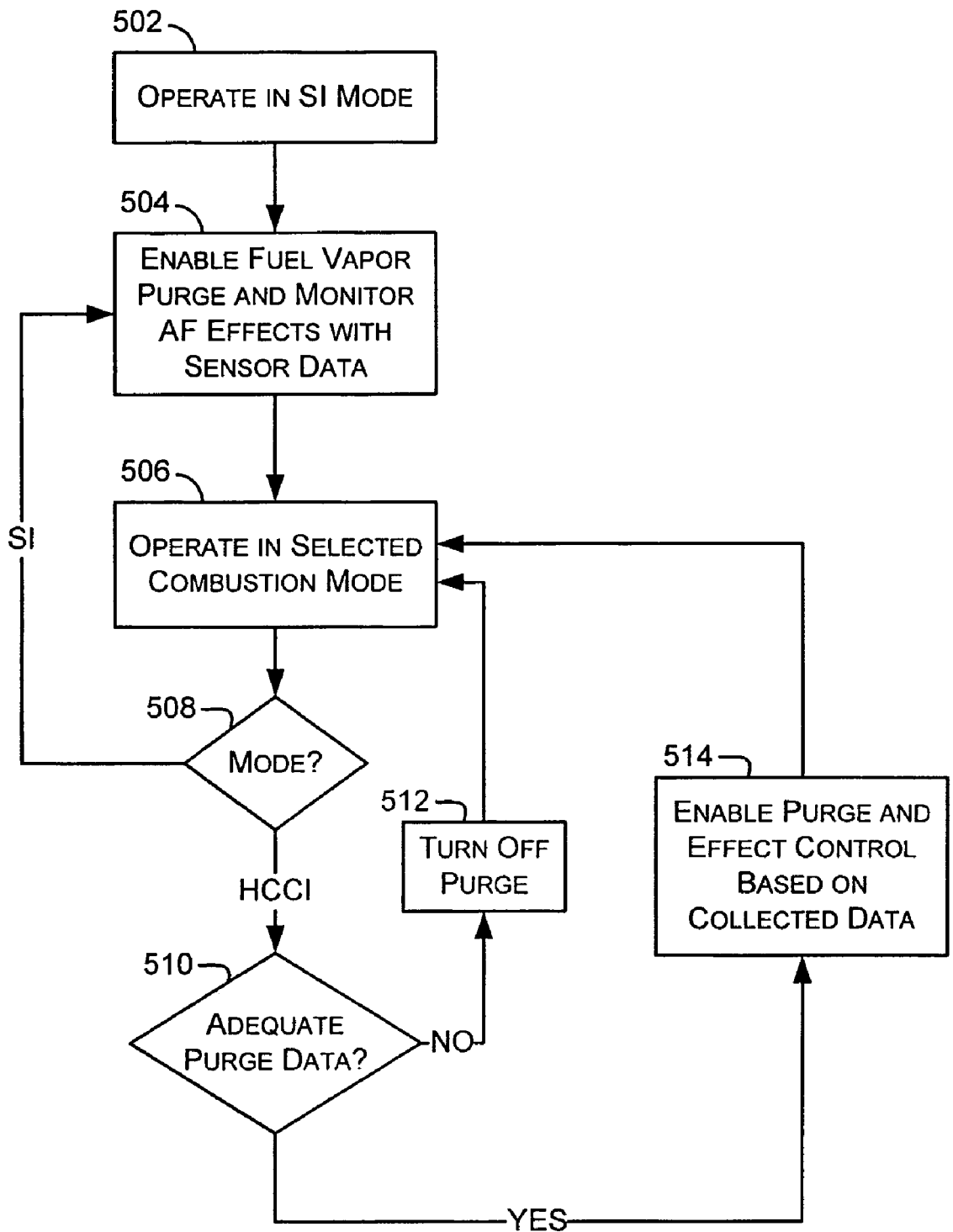
FIGS. 5-7 are further flowcharts showing further example routines and methods.

Referring first to embodiments in which all combustion cylinders operate in the same combustion mode at the same time, an exemplary method of operating an engine with fuel vapor purging is depicted in FIG. 5. In many settings, as previously explained, accurate assessment of vapor purge effects on air-fuel ratio may more readily be obtained from exhaust sensors during SI operation. Accordingly, the exemplary method generally involves assessing fuel vapor purge effects only while the cylinders are being operated in SI mode.

At 502, the method may first include operating the cylinders in SI mode. Typically, SI mode will be selected initially, at startup, until sufficient heat has been generated to operate in HCCI mode, other conditions permitting. Since the system is operating in SI mode, the method may include, at 504, enabling purge and using sensors (e.g., the various sensors shown in FIGS. 2A-2T) to determine the effects of purge on the air fuel ratio at different operating points. At 506, the method may include operating all of the combustion cylinders in a combustion mode selected from a plurality of available modes (SI, HCCI, HCCI with spark assist, etc.). A wide array of parameters and conditions may be assessed at this stage in connection with mode selection and transitions, including engine speed/load, charge temperature, valve operation, humidity, driver requested torque, etc. In addition, given that purge will not be performed, at least initially, during HCCI operation, the need to purge fuel vapors may also be a factor that contributes to mode selection. In other words, if it is necessary to purge fuel vapors, the system may transition into SI mode (or remain in SI mode if already there), in order to perform the necessary purge. This may be the case, even if HCCI mode would be otherwise dictated, due to the need to purge fuel vapors.

At 508 and 504, if the system is operating in SI mode, the method may include continuing to enable vapor purge as necessary and using the exhaust sensors to provide closed loop AF control. During SI operation, the system may be configured to generate a store of data that allows accurate determinations of the purging effect arising over a range of operating conditions (engine speed/load, charge temperature, etc.). When a sufficient store of data has been gathered, purge may be enabled even during HCCI. During HCCI operation, the collected data is used to provide AF control and ensure that purging is combined with the proper level of fuel injection to maintain the desired HCCI operation without inadvertently going too rich or pushing combustion toward instability.

Accordingly, if at 508 and 510 it is determined that HCCI operation is in effect but the data store is inefficient to allow purging, then fuel vapor purge is turned off at 512 during HCCI operation. As discussed above, the status of the fuel vapor purge may be used in making combustion mode selections. If purging is disabled during HCCI operation, a mode selection to SI may be made if the need to purge fuel vapors arises. Alternatively, if sufficient purge data has been gathered (510), then purging is permitted as necessary, at 514, with the stored data being used to provide combustion mode control.

Figure 6:
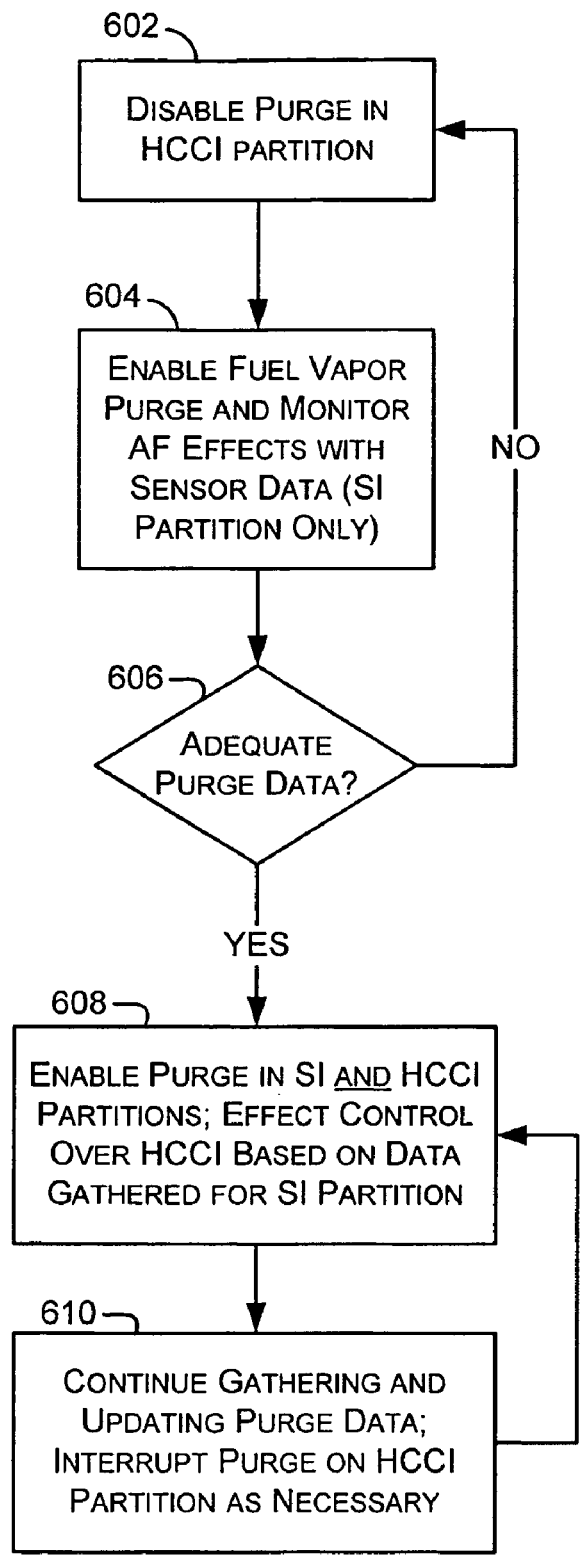

FIG. 6 depicts an exemplary method for operating an internal combustion engine and conducting fuel vapor purge in a configuration having separate cylinder groups dedicated to different combustion modes, in the present example an HCCI mode and an SI mode. Typically, in configurations employing the exemplary method, each cylinder group will have an independently controllable purge valve, such as in the examples of FIGS. 2B, 2D, 2F, 2H and 2T. At 602, the method may include disabling purge in the HCCI cylinder group. At 604, purging is enabled (e.g., purge vapors are permitted to flow into the cylinder group intake(s) as necessary) for the SI partition only, and the various sensors for that group are employed to monitor the effects of the purged vapors in order to perform closed-loop feedback control on the combustion (e.g., on the AF ratio of the input charges to the cylinders). At 606 and 602, if insufficient purge has been collected, the existing mode of operation continues (i.e., with HCCI purge disabled and SI purge enabled). Once sufficient data has been garnered from the SI partition (as determined at 606), purge may be enabled in the HCCI partition at 608 (e.g., by enabling of the appropriate purge valve 168) and closed-loop control may be effected on the HCCI partition by inferring from the data gathered on the SI partition. For example, it may be inferred that under a given set of conditions, purge flows to the HCCI partition will be equal to the purge flows that arose in the SI partition (assuming equal geometries of the inlet configurations, such as pipe diameters, etc.). As shown at 610, the method may continue with continual gathering of data within the SI partition, to enable accurate feedback control over the combustion occurring in the partitions, and to insure that the inferences applied to the HCCI partition are current and accurate. Purge within the HCCI operation may be interrupted as necessary during calibration and/or updating of the purge effect data.

Figure 7:
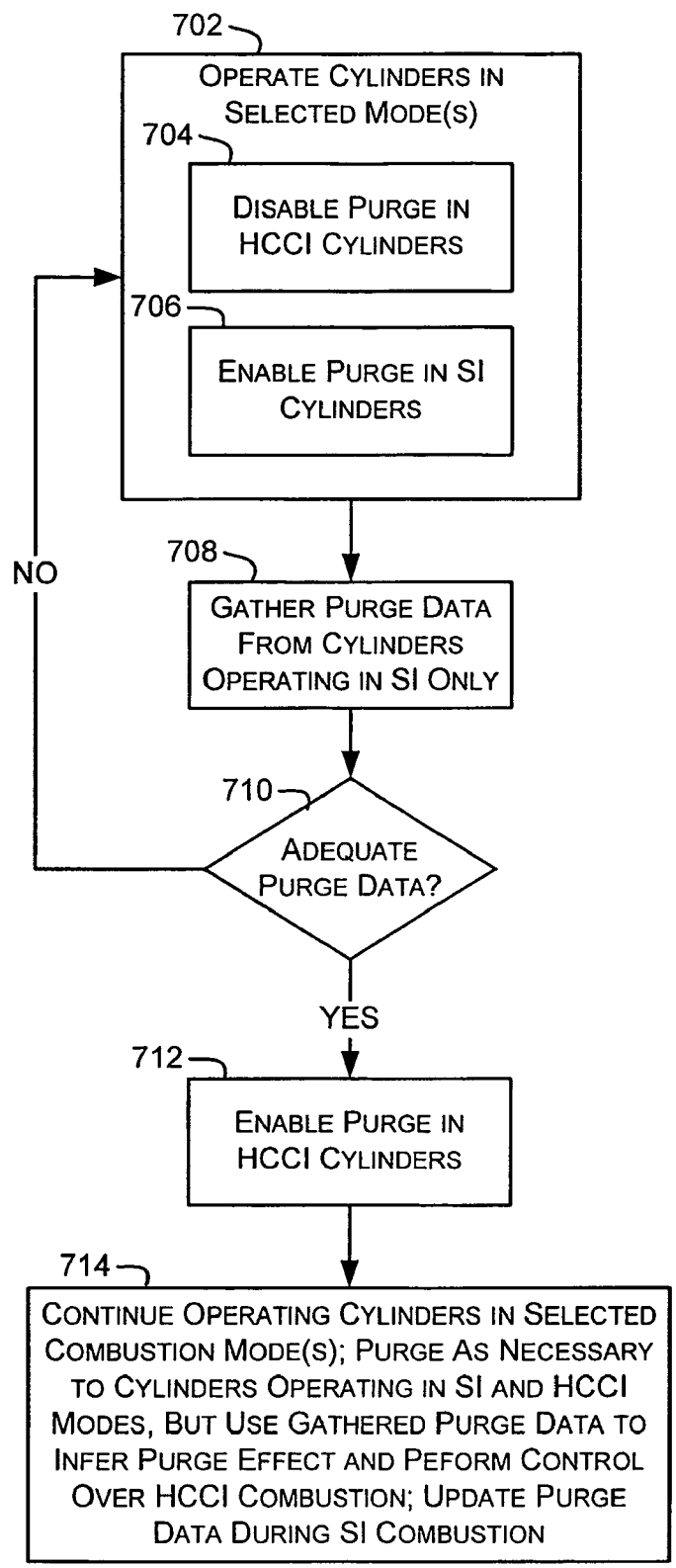

Referring now to FIG. 7, a further exemplary method of operating an internal combustion engine and providing for fuel vapor purge is shown. The depicted exemplary method may be applied in particular to engine configurations in which combustion cylinders are dynamically allocated among different combustion modes, as discussed with reference to FIGS. 3 and 4. In such a method, it may be useful to provide each of the combustion cylinders with a separately controllable purge valve 168, as shown in FIG. 2U.

First, at 702, the method includes operating the various combustion cylinders in the selected modes. This may entail operating all of the cylinders in one mode, operating a selected number of cylinders in one mode, with the remaining cylinders operated in another mode. More than two modes may be employed as well. A wide variety of possibilities exist. For purposes of clarity in the present example, the discussion will focus on a dynamic allocation of cylinders between SI and HCCI modes, such that at any given time, any number of cylinders (including zero) may be operating in either of the modes. Thus, at 702, the method may include operating all of the cylinders in HCCI mode, all of the cylinders in SI mode, one in HCCI with the remainder in SI, two in HCCI with the remainder in SI, etc.

Initially, as shown at 704 and 706, fuel vapor purging is disabled (e.g., via operation of the appropriate purge valve 168) for any cylinder operating in HCCI mode, and enabled for the cylinders operating in SI mode. At 708, the system goes into a data acquisition mode, in which purge data is accumulated from the cylinders operating in SI mode, in order to gather data about the effects (e.g., on AF ratio) of fuel vapor purge over a broad range of operating conditions. In this mode, purge data is only obtained from cylinders that are operating in the SI mode, in order to generate more accurate data concerning the effects of fuel vapor purge, so that that data can be accurately used later to provide effective closed loop control (via inference) for cylinders in the HCCI mode.

Accordingly, once sufficient data has been gathered, as determined at 710, purging may be enabled for cylinders when operating in HCCI mode as well, as shown at 712. Then, at 714, the method may include continuing to operate the various combustion cylinders in selected combustion mode(s), with or without dynamic combustion mode changes as discussed above. At 714, the method may also include continuing to gather purge data, purging as necessary in SI and in HCCI modes (but in HCCI, the data gathered from SI combustion will typically be employed to effect control over HCCI combustion when purging).

It should be appreciated that the various HCCI purging systems and method herein may be combined in many varied configurations with the other examples discussed herein. Disabling purge in HCCI and/or controlling HCCI purge via inference using gathered data may be implemented in systems employing full cylinder set transitions, partial set transitions, dynamic mode allocations, cylinder banks dedicated to a particular combustion mode, etc. A wide variety of purge configurations, exhaust configurations and sensor configurations may also be employed, including but not limited to the examples of FIGS. 2A-2U.

The invention claimed is:

1. An internal combustion engine, comprising,
    a gasoline fuel injection system;
    a plurality of combustion cylinders, each being configured to receive gasoline from the gasoline fuel injection system and combust a mixture of air and gasoline in either a spark ignition mode or a sparkless homogeneous charge compression ignition (HCCI) mode; and
    a fuel vapor purge system fluidly coupled to the plurality of combustion cylinders, where the internal combustion engine is configured to operate in a first purge state, in which fuel vapors are permitted to be received from the fuel vapor purge system only into combustion cylinders that are operating in the spark ignition mode, and in a second purge state, in which fuel vapors are permitted to be received from the fuel vapor purge system into combustion cylinders operating in the spark ignition mode and into combustion cylinders operating in the HCCI mode.

2. The engine of claim 1, further comprising an electronic engine controller configured to allocate the combustion cylinders into a first group which is operated in the spark ignition mode, and a second group which is operated in the HCCI mode, and where such allocation is dynamic such that the number of cylinders operating in each ignition mode is variable and changeable over time during operation of the internal combustion engine.

3. The engine of claim 2, further comprising a spark ignition aftertreatment system and a separate compression ignition aftertreatment system.

4. The engine of claim 2, where the spark ignition aftertreatment system includes a spark ignition exhaust manifold, and where the compression ignition aftertreatment system includes a compression ignition exhaust manifold.

5. The engine of claim 2, where the spark ignition aftertreatment system is thermally coupled with an aftertreatment device which is external to the spark ignition aftertreatment system so as to enable heat transfer from the spark ignition aftertreatment system to such external device.

6. The engine of claim 2, where the combustion cylinders are further configured to operate in a spark assist HCCI mode having an air-fuel ratio which is substantially higher than that employed in the spark ignition mode.

7. The engine of claim 2, where the engine is configured to use heat generated by combustion cylinders operating in the spark ignition mode to facilitate compression ignition for cylinders operating in the HCCI mode.

8. The engine of claim 2, where each combustion cylinder includes an exhaust valve mechanism, and where the state of each exhaust valve mechanism is dependent upon the ignition mode in which the associated combustion cylinder is operating.

9. The engine of claim 1, further comprising an electronic engine controller configured to control whether the engine is operated in the first purge state or the second purge state.

10. The engine of claim 1, further comprising an electronic engine controller configured to coordinate control of air-fuel ratios employed within the combustion cylinders, where in the case of fuel vapors added to combustion cylinders operating in the HCCI mode, such control is performed based on exhaust gas sensor data obtained from combustion cylinders receiving purged fuel vapors while operating in the spark ignition mode.

11. The engine of claim 10, where fuel vapors are prevented from being added to cylinders operating in the HCCI mode until exhaust gas sensor data has been obtained from combustion cylinders receiving purged fuel vapors while operating in the spark ignition mode.

12. The engine of claim 1, further comprising multiple fuel vapor purge valves.

13. The engine of claim 12, further comprising a fuel vapor purge valve for each combustion cylinder, each of the fuel vapor purge valves being independently controllable.

14. An internal combustion engine, comprising:
    a plurality of combustion cylinders configured to receive a mixture of gasoline and air and combust such mixture, where some of the combustion cylinders are configured to operate in a spark ignition mode, with the remaining combustion cylinders being configured to operate in a compression ignition mode; and
    a fuel delivery system configured to supply gasoline to the combustion cylinders, including a fuel vapor purge system configured to selectively control delivery of fuel vapors to the combustion cylinders,
    where the fuel vapor purge system is configured to operate in a first mode, in which fuel vapors are supplied only to combustion cylinders operating in the spark ignition mode, and then in a second mode, in which fuel vapors are supplied to all of the combustion cylinders.

15. The engine of claim 14, where when the fuel vapor purge system is operated in the second mode, the fuel delivery system is configured to control gasoline injections to the combustion cylinders operating in the compression ignition mode based on exhaust gas sensor data obtained from the combustion cylinders operating in the spark ignition mode.

16. An internal combustion engine, comprising:
    a plurality of combustion cylinders configured to receive a mixture of gasoline and air and combust such mixture, where some of the combustion cylinders are configured to operate in a spark ignition mode, with the remaining cylinders being configured to operate in a compression ignition mode;
    a fuel delivery system configured to supply gasoline to the combustion cylinders, including a fuel vapor purging system configured to selectively control delivery of evaporated fuel vapors from a fuel vapor purge source to the combustion cylinders,
    where the fuel vapor purging system is configured to operate in a first purge mode in which evaporated fuel vapors are permitted to be drawn from the fuel vapor purge source into less than all of the combustion cylinders.

17. The engine of claim 16, where the fuel vapor purging system is configured so that evaporated fuel vapors are permitted to be drawn from the fuel vapor purge source only into combustion cylinders operating in the spark ignition mode.

18. The engine of claim 16, further comprising an electronic engine controller configured to allocate the combustion cylinders into a first group which is operated in the spark ignition mode, and a second group which is operated in the compression ignition mode, and where such allocation is dynamic such that the number of cylinders operating in each ignition mode is variable and changeable over time during operation of the internal combustion engine.

19. The engine of claim 18, further comprising a spark ignition aftertreatment system and a separate compression ignition aftertreatment system.

20. The engine of claim 18, where the combustion cylinders are further configured to operate in a spark assist compression ignition mode having an air-fuel ratio which is substantially higher than that employed in the spark ignition mode.

21. The engine of claim 18, where the engine is configured to use heat generated by combustion cylinders operating in the spark ignition mode to facilitate compression ignition for cylinders operating in the compression ignition mode.

22. The engine of claim 18, where each combustion cylinder includes an exhaust valve mechanism, and where the state of each exhaust valve mechanism is dependent upon the combustion mode in which the associated combustion cylinder is operating.

23. The engine of claim 16, in which the fuel vapor purging system is configured to selectively operate in either the first purge mode or in a second purge mode, in which evaporated fuel vapors are permitted to be drawn from the fuel vapor purge source into all of the combustion cylinders.

24. The engine of claim 23, where in each of the first and second purge modes, the fuel delivery system is configured to perform closed-loop air-fuel ratio control during purging based on exhaust sensor data obtained from cylinders in the spark ignition mode, and without reference to exhaust sensor data from combustion cylinders in the compression ignition mode.

25. A method of operating an internal combustion engine, comprising:
providing gasoline to a plurality of combustion cylinders;
operating at least some of the combustion cylinders in a spark ignition mode, in which combustion is initiated by introduction of a spark within the combustion cylinder;
operating at least some of the combustion cylinders in a compression ignition mode, in which combustion is initiated by charge compression without aid of a spark;
purging fuel vapors and permitting such purged vapors to be received into at least one of the combustion cylinders; and
performing closed-loop air-fuel control over quantities of gasoline and air provided to the plurality of combustion cylinders, where such control is performed with reference to exhaust sensor data obtained from cylinders in the spark ignition mode, and without reference to exhaust sensor data from combustion cylinders in the compression ignition mode.

26. A method of operating an internal combustion engine having a plurality of combustion cylinders, comprising:
operating at least some of the combustion cylinders in a spark ignition mode;
operating at least some of the combustion cylinders in a homogeneous charge compression ignition (HCCI) mode;
preventing evaporated fuel vapors from a fuel vapor purge source from being added to combustion cylinders operating in the HCCI mode; and
dynamically changing, during operation of the combustion engine, how many of the combustion cylinders are operating in the spark ignition mode, and how many of the combustion cylinders are operating in the HCCI mode.

27. The method of claim 26, further comprising permitting evaporated fuel vapors to be drawn from the fuel vapor purge into combustion cylinders operating in the spark ignition mode, and using exhaust gas sensors to gather air-fuel ratio data from such combustion cylinders.

28. The method of claim 27, further comprising permitting evaporated fuel vapors to be drawn from the fuel vapor purge source into cylinders operating in the HCCI mode, and during such purge enablement for the HCCI combustion cylinders, using the air-fuel ratio data to control fuel injections to the combustion cylinders operating in the HCCI mode.

29. The method of claim 26, further comprising, for each of the combustion cylinders, selectively directing exhaust gases from the combustion cylinder to either a first aftertreatment system or a second aftertreatment system, depending on whether the combustion cylinders is being operated in the spark ignition mode or in the HCCI mode.

* * * * *